(12) United States Patent
Mitsuhashi

(10) Patent No.: US 8,797,657 B2
(45) Date of Patent: Aug. 5, 2014

(54) ZOOM LENS

(71) Applicant: Tamron Co., Ltd., Saitama (JP)

(72) Inventor: Takahiro Mitsuhashi, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 15 days.

(21) Appl. No.: 13/743,651

(22) Filed: Jan. 17, 2013

(65) Prior Publication Data

US 2013/0215518 A1 Aug. 22, 2013

(30) Foreign Application Priority Data

Feb. 21, 2012 (JP) ................................. 2012-035639

(51) Int. Cl.
*G02B 15/14* (2006.01)
*G02B 15/173* (2006.01)
(52) U.S. Cl.
CPC .................... *G02B 15/14* (2013.01); *G02B 15/173* (2013.01)
USPC .......................................... 359/683; 359/684

(58) Field of Classification Search
CPC ............................... G02B 15/14; G02B 15/173
USPC ......................... 359/676, 683, 684, 685
See application file for complete search history.

(56) References Cited

U.S. PATENT DOCUMENTS

| 7,180,681 | B2 | 2/2007 | Tomioka | |
|---|---|---|---|---|
| 7,558,003 | B2 * | 7/2009 | Ohtake | 359/684 |
| 2005/0280901 | A1 | 12/2005 | Tomioka | |
| 2013/0222921 | A1 * | 8/2013 | Wei | 359/683 |
| 2013/0222923 | A1 * | 8/2013 | Wei | 359/684 |

FOREIGN PATENT DOCUMENTS

| JP | 2006-003589 A | 1/2006 |
|---|---|---|
| JP | 2011-154390 A | 8/2011 |

* cited by examiner

*Primary Examiner* — David N Spector
(74) *Attorney, Agent, or Firm* — Foley & Lardner LLP

(57) ABSTRACT

A zoom lens includes sequentially from an object side, a first lens group having a positive refractive power, a second lens group having a negative refractive power, an aperture stop, a third lens group having a positive refractive power, a fourth lens group having a positive refractive power, and fifth lens group. The zoom lens further satisfies given conditions.

6 Claims, 15 Drawing Sheets

FIG.3
FIRST EMBODIMENT
WIDE ANGLE EDGE
SPHERICAL ABERRATION
Fno./ 1.63
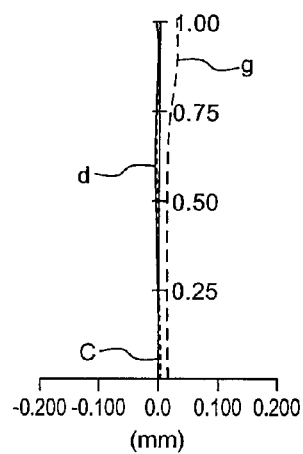
ASTIGMATISM
ω=23.91°
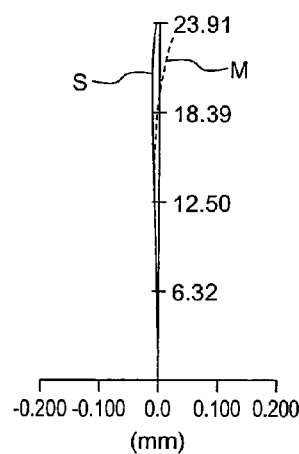
DISTORTION
ω=23.91°
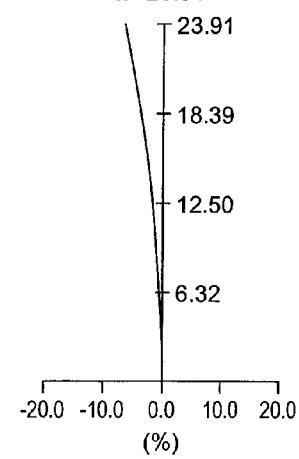
TELEPHOTO EDGE
Fno./ 2.00
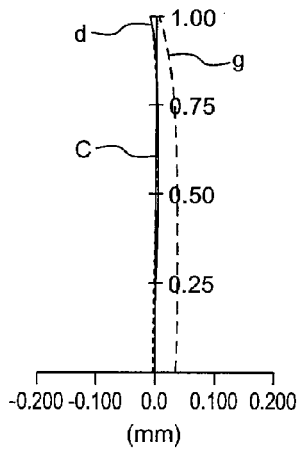
ω=3.90°
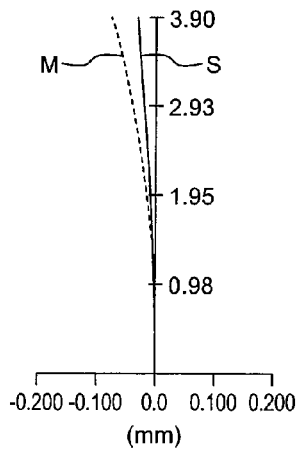
ω=3.90°
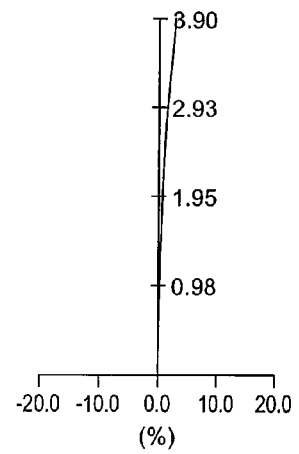

FIG.5
SECOND EMBODIMENT
WIDE ANGLE EDGE
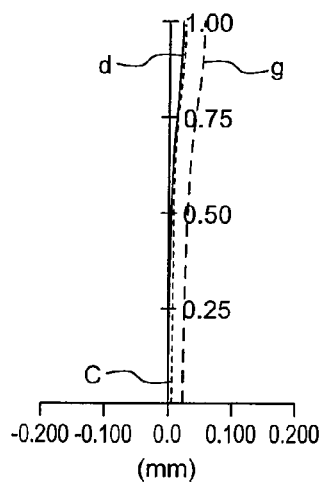
SPHERICAL ABERRATION
Fno./ 1.64
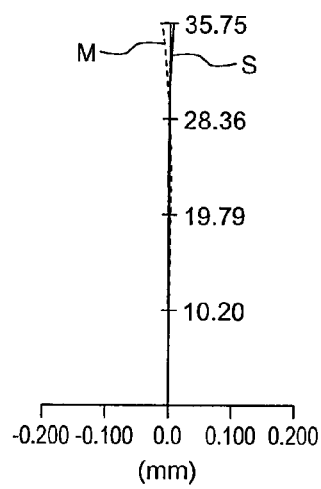
ASTIGMATISM
ω=35.75°
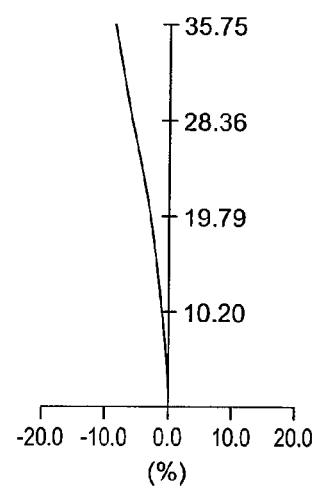
DISTORTION
ω=35.75°
TELEPHOTO EDGE
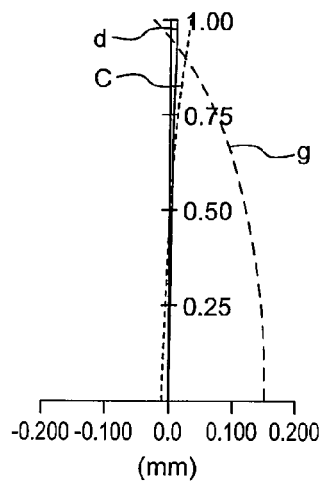
Fno./ 2.08
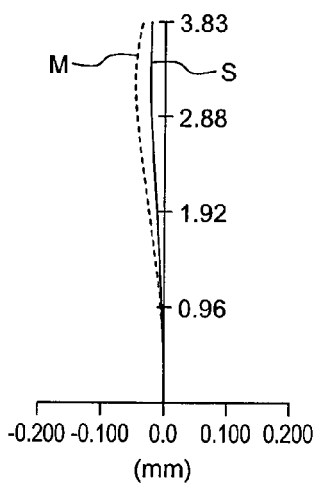
ω=3.83°
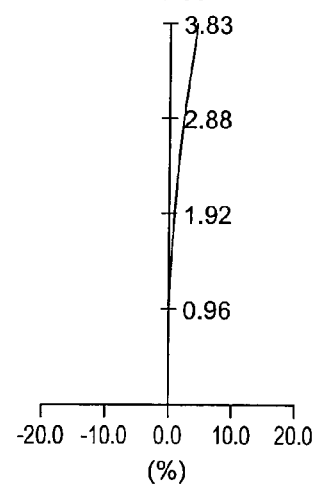
ω=3.83°

FIG.7
THIRD EMBODIMENT
WIDE ANGLE EDGE
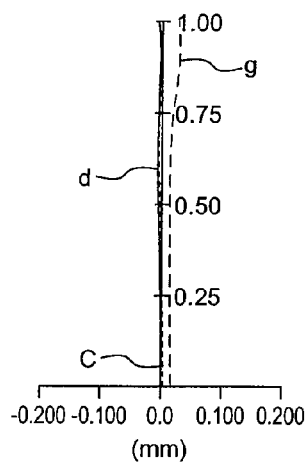
SPHERICAL ABERRATION
Fno./ 1.63
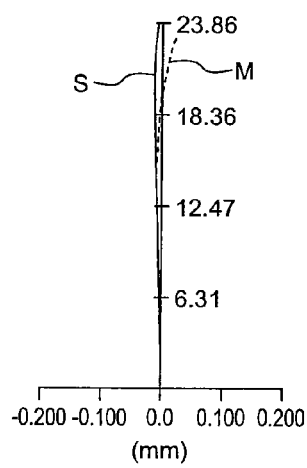
ASTIGMATISM
ω=23.86°
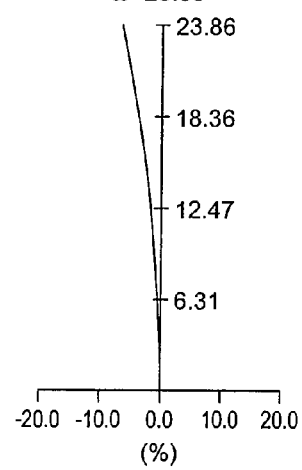
DISTORTION
ω=23.86°
TELEPHOTO EDGE
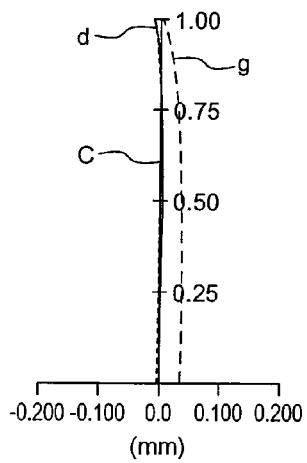
Fno./ 2.00
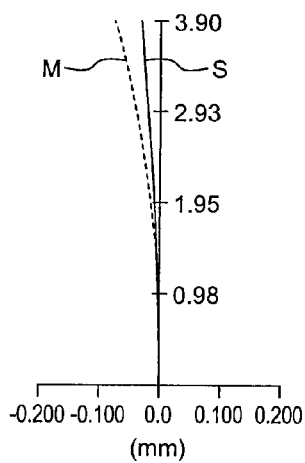
ω=3.90°
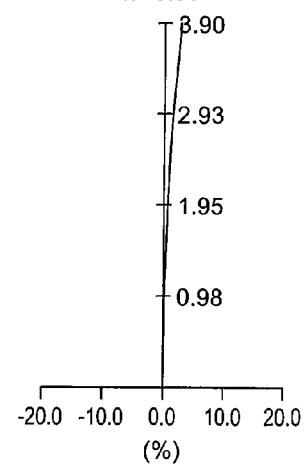
ω=3.90°

FIG.9
FOURTH EMBODIMENT
WIDE ANGLE EDGE
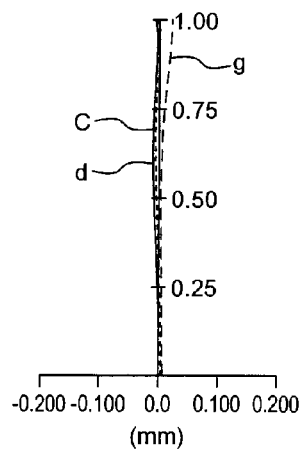
SPHERICAL ABERRATION
Fno./ 1.63
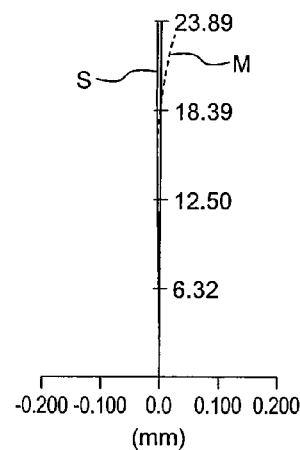
ASTIGMATISM
ω=23.89°
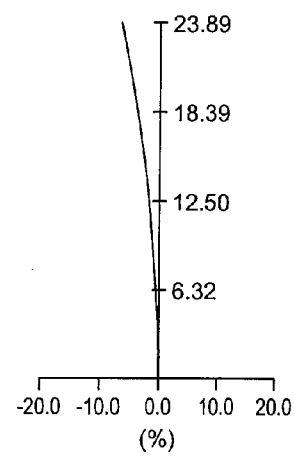
DISTORTION
ω=23.89°
TELEPHOTO EDGE
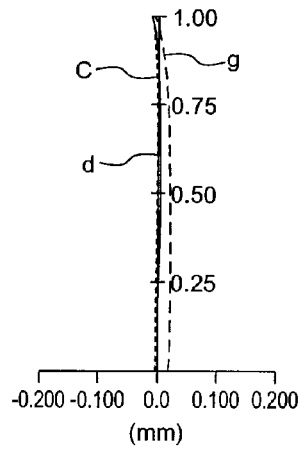
Fno./ 2.00
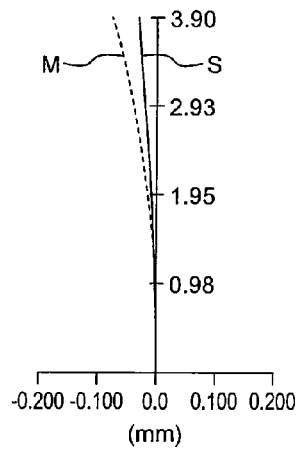
ω=3.90°
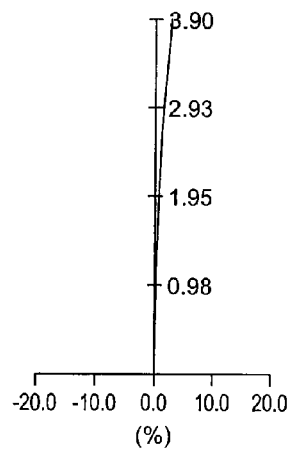
ω=3.90°

FIG.11
FIFTH EMBODIMENT
WIDE ANGLE EDGE
SPHERICAL ABERRATION
Fno./ 1.63
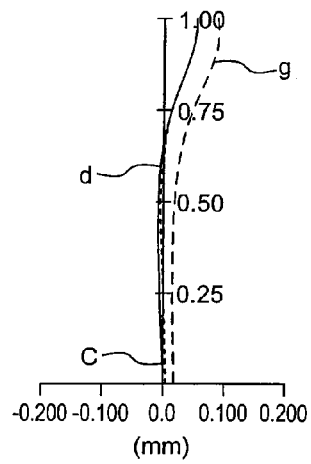
ASTIGMATISM
ω=21.22°
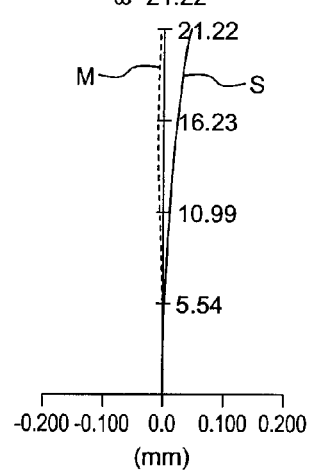
DISTORTION
ω=21.22°
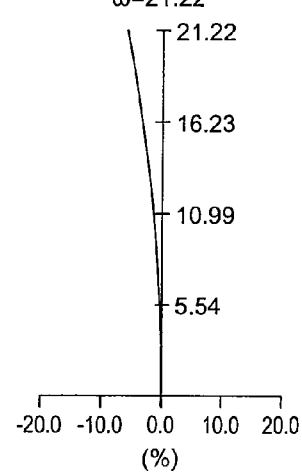
TELEPHOTO EDGE
Fno./ 1.95
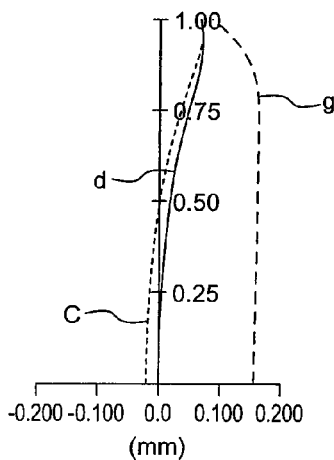
ω=3.49°
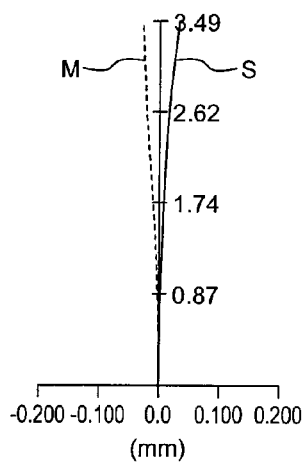
ω=3.49°
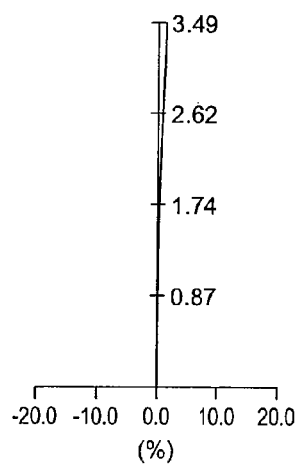

FIG.13
SIXTH EMBODIMENT
WIDE ANGLE EDGE
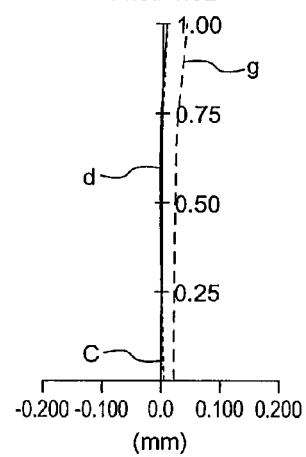
SPHERICAL ABERRATION
Fno./ 1.62
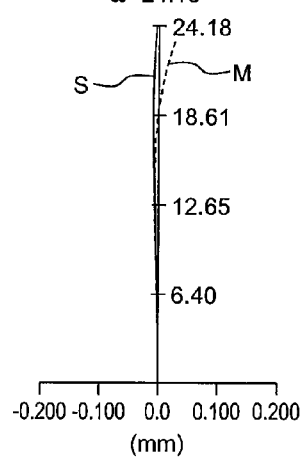
ASTIGMATISM
ω=24.18°
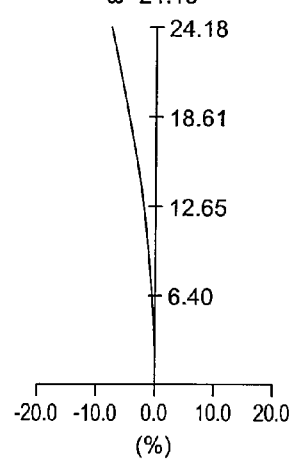
DISTORTION
ω=24.18°
TELEPHOTO EDGE
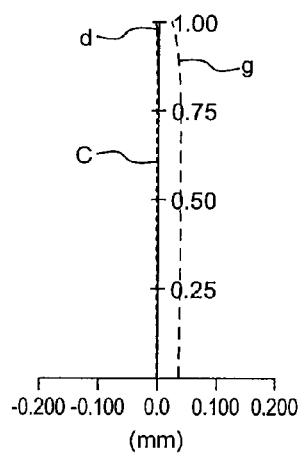
Fno./ 1.77
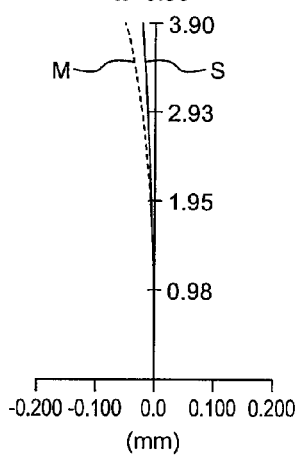
ω=3.90°
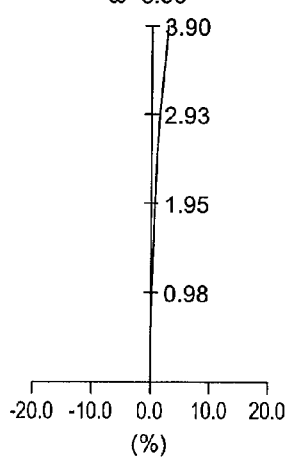
ω=3.90°

FIG.15
SEVENTH EMBODIMENT
WIDE ANGLE EDGE
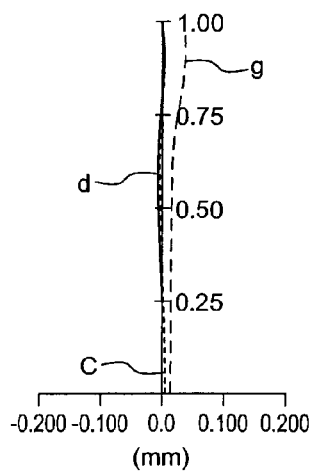
SPHERICAL ABERRATION
Fno./ 1.63
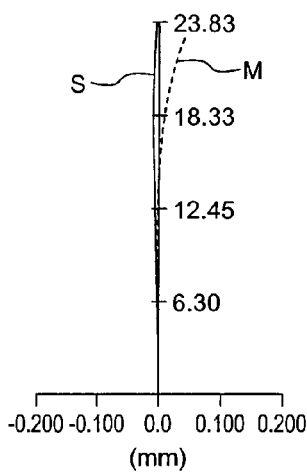
ASTIGMATISM
ω=23.83°
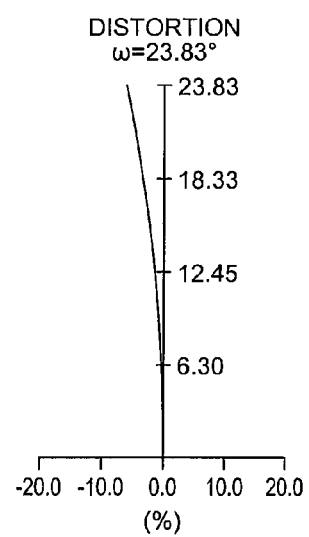
DISTORTION
ω=23.83°
TELEPHOTO EDGE
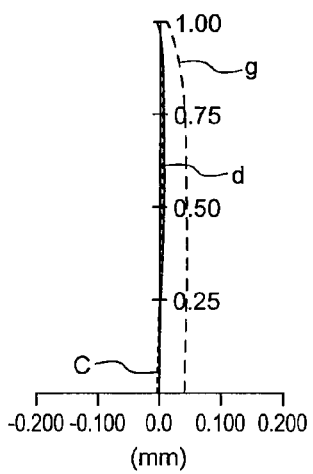
Fno./ 1.98
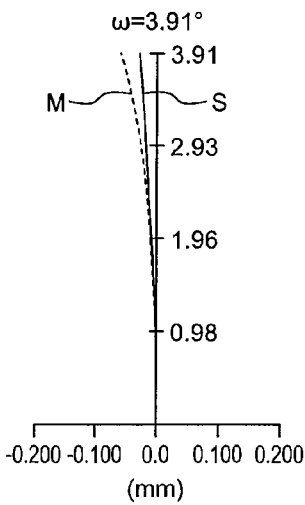
ω=3.91°
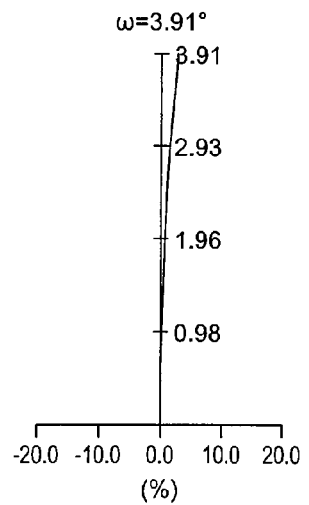
ω=3.91°

ZOOM LENS

BACKGROUND OF THE INVENTION

1. Field of the Invention

The present invention relates to a zoom lens suitable for an imaging apparatus equipped with a solid state image sensor such as a charge-coupled device (CCD) and a complementary metal-oxide-semiconductor (CMOS).

2. Description of the Related Art

An abundance of zoom lenses have been proposed that can be mounted to an imaging apparatus equipped with a solid state image sensor such as a CCD and a CMOS. Recently, rapid advances in achieving high pixel counts of solid state image sensors have enabled finer features of a subject to be seen and many zoom lenses for megapixel counts have emerged (for example, refer to Japanese Patent Laid-Open Publication Nos. 2011-154390 and 2006-3589).

In addition to advances in achieving high pixel counts, there is a rising need for high resolution zoom lenses having a long focal length and capable of handling megapixel counts under the visible light range to the near-infrared light range to enable reliable high-image recording for the collection of evidence by a surveillance camera during a crime as well as during normal times. Further, consequent to strong demand for reductions in the size of imaging apparatuses, a zoom lens that is simple and compact is desirable.

Although the zoom lens recited in Japanese Patent Laid-Open Publication No. 2011-154390 realizes a high zoom ratio lens having a simple structure, with respect to near-infrared light, axial chromatic aberration and chromatic difference of magnification at the telephoto edge is prominent and optical performance markedly deteriorates. Further, with the zoom lens recited in Japanese Patent Laid-Open Publication No. 2006-3589, although aberration at high zoom ratios and up to the near-infrared light range is corrected, the light output from a third group has a tendency to diverge and therefore, aberration variations consequent to focusing become large and high optical performance cannot be maintained. Furthermore, differences in optical performance arise among manufactured products.

SUMMARY OF THE INVENTION

It is an object of the present invention to at least solve the above problems in the conventional technologies.

A zoom lens according to one aspect of the invention includes sequentially from an object side, a first lens group having a positive refractive power, a second lens group having a negative refractive power, an aperture stop, a third lens group having a positive refractive power, a fourth lens group having a positive refractive power, and fifth lens group. The second lens group is moved along an optical axis, from the object side toward an image side, to zoom from a wide angle edge to a telephoto edge. The fourth lens group is moved along the optical axis to correct image plane variation accompanying zooming. The third lens group includes sequentially from the object side, a positive lens having at least one aspheric surface, a cemented lens formed by a positive lens and a negative lens, and a positive lens group. The fourth lens group includes sequentially from the object side, a positive lens group, and a cemented lens formed by a positive lens and a negative lens. The fifth lens group includes sequentially from the object side, at least one negative lens and at least one positive lens.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a diagram of various types of aberration occurring in the zoom lens according to the first embodiment;

FIG. 5 is a diagram of various types of aberration occurring in the zoom lens according to the second embodiment;

FIG. 7 is a diagram of various types of aberration occurring in the zoom lens according to the third embodiment;

FIG. 9 is a diagram of various types of aberration occurring in the zoom lens according to the fourth embodiment;

FIG. 11 is a diagram of various types of aberration occurring in the zoom lens according to the fifth embodiment;

FIG. 13 is a diagram of various types of aberration occurring in the zoom lens according to the sixth embodiment;

FIG. 15 is a diagram of various types of aberration occurring in the zoom lens according to the seventh embodiment.

DETAILED DESCRIPTION OF THE PREFERRED EMBODIMENTS

Figure 1:
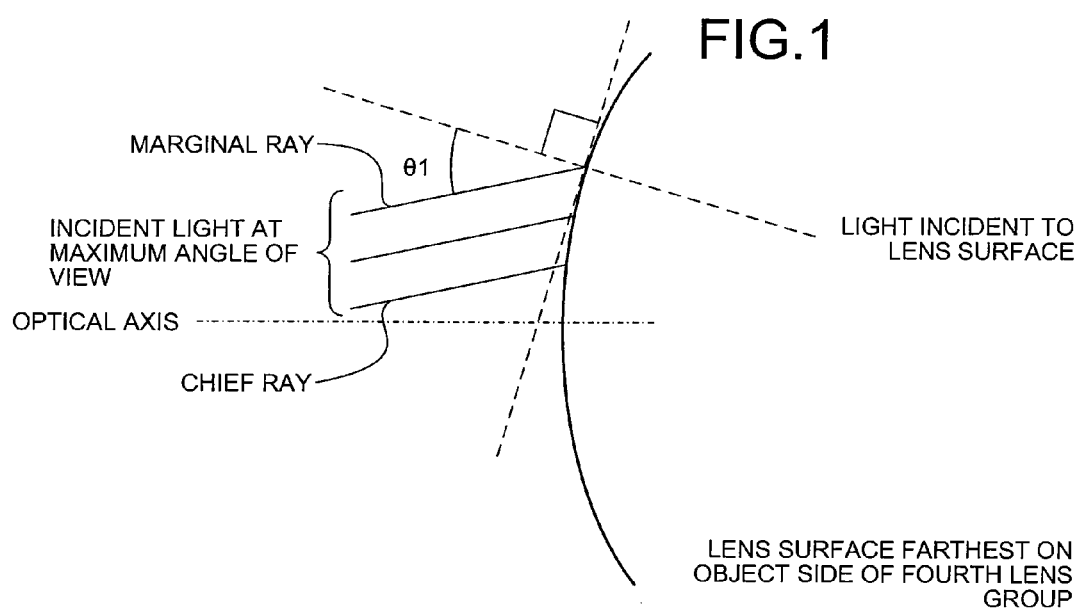
FIG. 1 is a diagram depicting a state where incident light at the maximum angle of view is incident on a lens surface farthest on the object side of a fourth lens group.

Preferred embodiments of a zoom lens according to the present invention are explained in detail below with reference to the accompanying drawings.

The zoom lens according to the present invention includes sequentially from a side nearest an object (object side), a first lens group having a positive refractive power, a second lens group having a negative refractive power, an aperture stop, a third lens group having a positive refractive power, a fourth lens group having a positive refractive power, and a fifth lens group. The second lens group is moved along an optical axis, whereby zooming is performed from a wide angle edge to a telephoto edge. Further, the fourth lens group is moved along the optical axis, whereby image plane variation accompanying zooming is corrected and focusing is performed.

The third lens group includes sequentially from the object side, a positive lens having at least one aspheric surface; a cemented lens formed by a positive lens and a negative lens; and a positive lens group. By disposing the positive aspheric lens farthest on the object side of the third lens group, spherical aberration can be corrected favorably. By including the cemented lens formed by a positive lens and a negative lens, axial chromatic aberration and chromatic difference of magnification can be corrected favorably. By disposing the positive lens group farthest on an image side (side nearest the image) of the third lens group, the light incident on the fourth lens group can be converged. As a result, aberration variations at the time of focusing and arising when the light incident on the fourth lens group diverges can be suppressed. The positive lens group includes at least one positive lens. Configuring the positive lens group by one positive lens enables manufacturing costs to be reduced and the length of the optical system to be shortened.

The fourth lens group includes sequentially from the object side, a positive lens group, and a cemented lens formed by a positive lens and a negative lens. The positive lens group disposed farthest on the object side of the fourth lens group further converges the light converged by the positive lens group of the third lens group. The positive lens group of the fourth lens group also includes at least one positive lens and by configuring the positive lens group by one positive lens, manufacturing costs and the length of the optical system can be reduced. Although the fourth lens group also includes a cemented lens formed by a positive lens and a negative lens, disposal of the cemented lens in the fourth lens group enables favorable correction of the chromatic difference of magnification that could not be corrected by the cemented lens in the third lens group.

The fifth lens group includes sequentially from the object side, at least one negative lens and at least one positive lens. By including the fifth lens group, field curvature can be corrected favorably.

Consequent to having the configuration above, the zoom lens according to the present invention can favorably correct various types of aberration occurring over the entire zoom range with respect to light from the visible light range to the near-infrared light range, and is applicable to imaging apparatuses equipped with solid state image sensors for which megapixel counts are progressing.

To realize a long focal length while facilitating size reductions of the optical system and further achieving preferable optical performance, in the present invention, various conditions are set as indicated below, in addition to the configuration above.

The zoom lens according to the present invention preferably satisfies the following conditional expressions, where f3 is the focal length of the third lens group; fT is the focal length of the entire optical system at the telephoto edge; ΔD4 is the difference of the interval between the third lens group and the fourth lens group at the wide angle edge and the interval between the third lens group and the fourth lens group at the telephoto edge; β3T is the zoom ratio of the third lens group at the telephoto edge; β4T is the zoom ratio of the fourth lens group at the telephoto edge; and υ3p is the Abbe number with respect to the d-line of the positive lens of the cemented lens in the third lens group.

$$0.50 \leq f3/fT \leq 0.80 \tag{1}$$

$$0.08 \leq \Delta D4/fT \leq 0.20 \tag{2}$$

$$-300 \leq \beta 3T/\beta 4T \leq -20 \tag{3}$$

$$90 \leq \upsilon 3p \leq 100 \tag{4}$$

Conditional expression (1) prescribes a range of a proper ratio of the focal length f3 of the third lens group and the focal length fT of the entire optical system at the telephoto edge. By satisfying conditional expression (1), the zoom lens in addition to realizing a long focal length and facilitating a compact optical system, favorably corrects visible light range aberration and near-infrared light range aberration by a proper amount, using the same lens arrangement.

Below the lower limit of conditional expression (1), the positive refractive index of the third lens group becomes too strong, whereby spherical aberration of the visible light range becomes over corrected and thus, favorable correction of visible light range aberration and near-infrared light range aberration by a proper amount becomes impossible. Meanwhile, above the upper limit of conditional expression (1), the positive refractive index of the third lens group becomes too weak, increasing the overall length of the optical system and making size reductions of the optical system difficult.

More favorable results can be expected if the zoom lens satisfies conditional expression (1) within the range indicated below.

$$0.55 \leq f3/fT \leq 0.75 \tag{1a}$$

By satisfying conditional expression (1) within the range prescribed by conditional expression (1a), the zoom lens can favorably correct spherical aberration of the visible light range and field curvature of the near-infrared light range by a proper amount and can further correct spherical aberration of the visible light range more favorably.

Conditional expression (2) prescribes a range of a proper ratio of the difference ΔD4 (the difference of the interval between the third lens group and the fourth lens group at the wide angle edge and the interval between the third lens group and the fourth lens group at the telephoto edge) and the focal length fT (the focal length of the entire optical system at the telephoto edge). By satisfying conditional expression (2), the zoom lens can favorably correct field curvature over the entire zoom range, on top of facilitating size reductions of the optical system.

Below the lower limit of conditional expression (2), when image plane variation accompanying zooming is corrected, the fourth lens group cannot be moved a sufficient distance, making field curvature occurring near an intermediate focal position particularly difficult to correct. Meanwhile, above the upper limit of conditional expression (2), when image plane variation accompanying zooming is corrected, the fourth lens group is moved excessively, increasing the overall length of the optical system and making size reductions of the optical system difficult.

More favorable results can be expected if the zoom lens satisfies conditional expression (2) within the range indicated below.

$$0.08 \leq \Delta D4/fT \leq 0.15 \tag{2a}$$

By satisfying conditional expression (2) within the range prescribed by conditional expression (2a), the zoom lens more favorably corrects field curvature at the telephoto edge.

Conditional expression (3) prescribes a range of a proper ratio of the zoom ratio β3T of the third lens group at the telephoto edge and the zoom ratio β4T of the fourth lens group at the telephoto edge. By satisfying conditional expression (3), the zoom lens can improve optical performance at the telephoto edge.

Below the lower limit of conditional expression (3), the positive refractive power of the fourth lens group becomes too strong and at the telephoto edge, aberration variations consequent to focusing become large. Further, manufacturing of the optical system becomes difficult and differences in optical performance arise among manufactured products. Meanwhile, above the upper limit of conditional expression (3), the positive refractive power of the third lens group becomes too strong and at the telephoto edge, the correction of visible light range aberration and of near-infrared light range aberration by a proper amount becomes difficult.

Conditional expression (4) prescribes a proper range of the Abbe number υ3p with respect to the d-line of the positive lens of the cemented lens in the third lens group. By satisfying conditional expression (4), the zoom lens can favorably correct axial chromatic aberration and chromatic difference of magnification of the near-infrared light range; and can favorably correct field curvature at the wide angle edge.

Below the lower limit of conditional expression (4), the correction of axial chromatic aberration/chromatic difference of magnification of near-infrared light at the wide angle edge and at the telephoto edge becomes difficult. Meanwhile, above the upper limit of conditional expression (4), the refractive index of the positive lens of the cemented lens in the third lens group becomes low with respect to the d-line, making the correction of field curvature at the wide angle edge difficult, if the positive lens is formed of a glass material.

To favorably correct visible light range aberration and near-infrared light range aberration by a proper amount, the zoom lens according to the present invention preferably satisfies the following conditional expressions, where $\Delta\nu 3BA$ is the difference of the Abbe numbers (with respect to the d-line) of the positive lens and the negative lens forming the cemented lens in the third lens group; and $\Delta\nu 4BA$ is the difference of the Abbe numbers (with respect to the d-line) of the positive lens and the negative lens of the cemented lens in the fourth lens group.

$$30 \leq |\Delta\nu 3BA| \leq 78 \quad (5)$$

$$50 \leq |\Delta\nu 4BA| \leq 78 \quad (6)$$

Conditional expression (5) prescribes a proper range of the absolute value of the difference $\Delta\nu 3BA$ of the Abbe numbers of the positive lens and the negative lens of the cemented lens in the third lens group. By satisfying conditional expression (5), the zoom lens can favorably correct visible light range aberration and near-infrared aberration at the wide angle edge, by a proper amount.

Below the lower limit of conditional expression (5), the correction of axial chromatic aberration and chromatic difference of magnification of near-infrared light at the wide angle edge becomes difficult. Meanwhile, above the upper limit of conditional expression (5), favorable correction of visible light range aberration and near-infrared light range aberration at the wide angle edge, by a proper amount becomes difficult.

More favorable results can be expected if the zoom lens satisfies condition expression (5) within the range indicated below.

$$30 \leq |\Delta\nu 3BA| \leq 60 \quad (5a)$$

By satisfying conditional expression (5) within the range prescribed by conditional expression (5a), the zoom lens can more effectively correct chromatic difference of magnification and field curvature at the wide angle edge.

Conditional expression (6) prescribes a proper range of the absolute value of the difference $\Delta\nu 4BA$ of the Abbe number of the positive lens and of the negative lens of the cemented lens of the fourth lens group. By satisfying conditional expression (6), the zoom lens can favorably correct visible light range aberration and near-infrared light range aberration at the telephoto edge, by a proper amount.

Below the lower limit of conditional expression (6), the correction of axial chromatic aberration and chromatic difference of magnification of near-infrared light at the telephoto edge becomes difficult. Meanwhile, above the upper limit of conditional expression (6), favorable correction of visible light range aberration and near-infrared light range aberration at the telephoto edge, by a proper amount, becomes difficult.

More favorable results can be expected if the zoom lens satisfies conditional expression (6) within the range indicated below.

$$50 \leq |\Delta\nu 4BA| \leq 70 \quad (6a)$$

By satisfying conditional expression (6) within the range prescribed by conditional expression (6a), the zoom lens can more effectively correct chromatic difference of magnification and field curvature at the telephoto edge.

To achieve more favorable optical performance without sacrificing size reductions of the optical system, the zoom lens according to the present invention preferably satisfies the following conditional expressions, where f3 is the focal length of the third lens group, f4 is the focal length of the fourth lens group, and f5 is the focal length of the fifth lens group.

$$0.10 \leq |f3/f5| \leq 0.70 \quad (7)$$

$$0.10 \leq |f4/f5| \leq 0.70 \quad (8)$$

Conditional expression (7) prescribes a proper range of the absolute value of the ratio of the focal length f3 of the third lens group and the focal length f4 of the fourth lens group. By satisfying conditional expression (7), the zoom lens can favorably correct field curvature at the wide angle edge without sacrificing size reductions of the optical system.

Below the lower limit of conditional expression (7), the refractive power of the fifth lens group becomes too weak, making correction of field curvature at the wide angle edge difficult. Meanwhile, above the upper limit of conditional expression (7), the positive refractive index of the third lens group becomes too weak, increasing the overall length of the optical system and making size reductions of the optical system difficult.

Conditional expression (8) prescribes a proper range of the absolute value of the ratio of the focal length f4 of the fourth lens group and the focal length f5 of the fifth lens group. By satisfying conditional expression (8), the zoom lens can suppress aberration variations consequent to focusing, without sacrificing size reductions of the optical system.

Below the lower limit of conditional expression (8), the refractive power of the fourth lens group becomes too strong, making aberration variations consequent to focusing large. Further, manufacturing of the optical system becomes difficult and differences in optical performance arise among the manufactured products. Meanwhile, above the upper limit of conditional expression (8), the positive refractive power of the fourth lens group becomes too weak, increasing the distance that the fourth lens group is moved when image plane variation accompanying zooming is corrected and thereby increasing the overall length of the optical system and making size reductions of the optical system difficult.

To secure more favorable optical performance, in the zoom lens according to the present invention, the maximum angle of incidence has to be set for the marginal ray of the light incident on the lens surface farthest on the object side of the fourth lens group, at the maximum angle of view for the wide angle edge and for the telephoto edge. FIG. 1 is a diagram depicting a state where incident light at the maximum angle of view is incident on the lens surface farthest on the object side of the fourth lens group. In the drawing, $\theta 1$ represents the angle of incidence of the marginal ray of the incident light at the maximum angle of view, to the lens surface farthest on the object side of the fourth lens group. $\theta 1$ is suitably set for the wide angle edge and the telephoto edge, and the refractive index of the positive lens disposed farthest on the object side of the fourth lens group is suitable set with respect to the d-line, thereby enabling a zoom lens having more favorable optical performance to be realized.

The zoom lens according to the present invention preferably satisfies the following conditional expressions, where N4ob is the refractive index (with respect to the d-line) of the positive lens disposed farthest on the object side of the fourth lens group; θ1(W) is the maximum angle of incidence of the marginal ray at the maximum angle of view for the wide angle edge, to the lens surface farthest on the object side of the fourth lens group; ωw is the half-angle of the optical system at the wide angle edge; θ1(T) is the maximum angle of incidence of the marginal ray at the maximum angle of view for the telephoto edge, to the lens surface farthest on the object side of the fourth lens group; and ωT is the half-angle of the optical system at the telephoto edge.

$$1.85 \leq N4ob \leq 1.95 \tag{9}$$

$$0.30 \leq \theta1(W)/\omega W \leq 0.60 \tag{10}$$

$$2.5 \leq \theta1(T)/\omega T \leq 5.0 \tag{11}$$

Conditional expression (9) prescribes a proper range of the refractive index N4ob (with respect to the d-line) of the positive lens disposed farthest on the object side of the fourth lens group. By satisfying conditional expression (9), the zoom lens can favorably correct spherical aberration and axial chromatic aberration at the wide angle edge and the telephoto edge.

Below the lower limit of conditional expression (9), favorable correction of spherical aberration at the wide angle edge and at the telephoto edge becomes difficult. Meanwhile, above the upper limit of conditional expression (9), if the positive lens disposed farthest on the object side of the fourth lens group is formed of a glass material, the lens becomes a high dispersion lens, making the correction of axial chromatic aberration at the wide angle edge and at the telephoto edge difficult.

Conditional expression (10) prescribes a proper range of the ratio of the maximum angle of incidence θ1(W) of the marginal ray at the maximum angle of view for the wide angle edge, to the lens surface farthest on the object side of the fourth lens group and the half-angle ωw of the optical system at the wide angle edge. By satisfying conditional expression (10), the zoom lens can further improve the optical performance of the optical system at the wide angle edge.

Below the lower limit of conditional expression (10), the exit pupil position at the wide angle edge becomes too close to the image plane. Typically, micro-lenses for effectively making light enter are provided on a surface of the solid state image sensor. Nonetheless, if the exit pupil position is too close to the image plane, off-axis light output from the optical system enters the image plane at an angle causing shading to occur. In this case, the collection of light by the micro-lens becomes insufficient and an undesirable state occurs where the image brightness at a central portion and at the periphery drastically change. Meanwhile, above the upper limit of conditional expression (10), aberration variations at the wide angle edge and consequent to focusing are large. Furthermore, manufacturing of the optical system becomes difficult and differences in optical performance among the manufactured products arise.

Conditional expression (11) prescribes a proper range of the ratio of the maximum angle of incidence θ1(T) of the marginal ray at the maximum angle of view for the telephoto edge, to the lens surface farthest on the object side of the fourth lens group and the half-angle ωT of the optical system at the telephoto edge. By satisfying conditional expression (11), the zoom lens can further improve the optical performance of the optical system at the telephoto edge.

Below the lower limit of conditional expression (11), the exit pupil position at the telephoto edge becomes to close to the image plane. In this case as well, the same problems described above arise and an undesirable state occurs where the image brightness at a central portion and at the periphery drastically change. Meanwhile, above the upper limit of conditional expression (11), aberration variations at the telephoto edge and consequent to focusing are large. Furthermore, manufacturing of the optical system becomes difficult and differences in optical performance among the manufactured products arise.

To further improve near-infrared light resolution at the telephoto edge, the zoom lens according to the present invention preferably satisfies the following conditional expression, where υ3a is the Abbe number (with respect to the d-line) of the positive lens disposed farthest on the object side of the third lens group.

$$65.0 \leq \upsilon 3a \leq 85.0 \tag{12}$$

Conditional expression (12) prescribes a proper range of the Abbe number υ3a (with respect to the d-line) of the positive lens disposed farthest on the object side of the third lens group. By satisfying conditional expression (12), the zoom lens can particularly improve resolution of near-infrared light at the telephoto edge.

Below the lower limit of conditional expression (12), the correction of axial chromatic aberration of near-infrared light at the wide angle edge and at the telephoto edge becomes difficult. Meanwhile, above the upper limit of conditional expression (12), if the positive lens disposed farthest on the object side of the third lens group is formed of a glass material, the refractive index of the positive lens becomes low with respect to the d-line and the correction of spherical aberration at the wide angle edge becomes difficult.

As described, the zoom lens according to the present invention has the above configuration, enabling the realization of a long focal length by a simple and compact structure and further enabling the realization of a high-resolution optical system that can favorably correct various types of aberration occurring over the entire zoom range with respect to light from the visible light range to the near-infrared light range and that can handle megapixel counts. In particular, by satisfying the conditional expressions above, the zoom lens can achieve more favorable optical performance without sacrificing size reductions of the optical system.

With reference to the accompanying drawings, embodiments of the zoom lens according to the present invention will be described in detail. Nonetheless, the present invention is not limited by the embodiments below.

Figure 2:
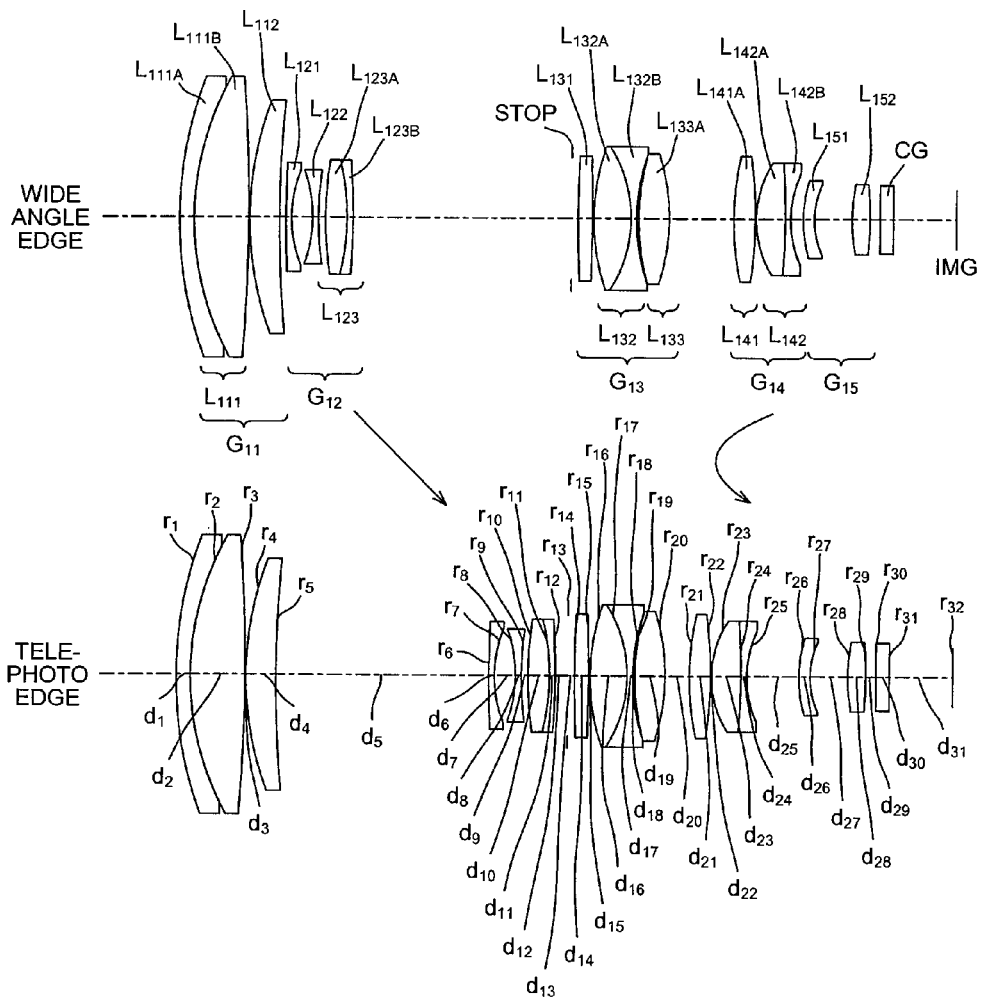
FIG. 2 is a cross sectional view (along the optical axis) of a zoom lens according to a first embodiment.

FIG. 2 is a cross sectional view (along the optical axis) of the zoom lens according to a first embodiment. The zoom lens includes sequentially from a side nearest a non-depicted object (the object side), a first lens group $G_{11}$ having a positive refractive power, a second lens group $G_{12}$ having a negative refractive power, an aperture stop STOP, a third lens group $G_{13}$ having a positive refractive power, a fourth lens group $G_{14}$ having a positive refractive power, and a fifth lens group $G_{15}$ having a positive refractive power.

A cover glass CG is disposed between the fifth lens group $G_{15}$ and an imaging plane IMG. The cover glass CG is disposed as necessary and may be omitted accordingly. At the image plane IMG, the light receiving surface of a solid state image sensor, such as a CCD and CMOS, is disposed.

The first lens group $G_{11}$ includes sequentially from the object side, a cemented lens $L_{111}$ formed by a negative lens $L_{111A}$, and a positive lens $L_{111B}$, and a positive lens $L_{112}$.

The second lens group $G_{12}$ includes sequentially from the object side, a negative lens $L_{121}$, a negative lens $L_{122}$, and a cemented lens $L_{123}$ formed by a positive lens $L_{123A}$ and a negative lens $L_{123B}$.

The third lens group $G_{13}$ includes sequentially from the object side, a positive lens $L_{131}$, a cemented lens $L_{132}$ formed by a positive lens $L_{132A}$ and a negative lens $L_{132B}$, and a positive lens group $L_{133}$ configured by a positive lens $L_{133A}$. Both surfaces of the positive lens $L_{131}$ are aspheric.

The fourth lens group $G_{14}$ includes sequentially from the object side, a positive lens group $L_{141}$ configured by a positive lens $L_{141A}$, and a cemented lens $L_{142}$ formed by a positive lens $L_{142A}$ and a negative lens $L_{142B}$.

The fifth lens group $G_{15}$ includes sequentially from the object side, a negative lens $L_{151}$ and a positive lens $L_{152}$.

The zoom lens zooms from the wide angle edge to the telephoto edge by moving the second lens group $G_{12}$ along the optical axis, from the object side to the imaging plane IMG side. Further, the zoom lens corrects image plane variations accompanying zooming and performs focusing by moving the fourth lens group $G_{14}$ along the optical axis.

Here, various values related to the zoom lens according to the first embodiment are given.

---

Focal length of entire zoom lens = 8.20 (wide angle edge) to 48.55 (fT: telephoto edge)
F number = 1.63 (wide angle edge) to 2.00 (telephoto edge)
Half-angle (ω) = 23.91 (ωW: wide angle edge) to 3.90 (ωT: telephoto edge)

(Lens data)

| | | |
|---|---|---|
| $r_1 = 45.2246$ | | |
| $d_1 = 1.50$ | $nd_1 = 1.80809$ | $vd_1 = 22.76$ |
| $r_2 = 31.1449$ | | |
| $d_2 = 6.03$ | $nd_2 = 1.49700$ | $vd_2 = 81.61$ |
| $r_3 = -184.9157$ | | |
| $d_3 = 0.15$ | | |
| $r_4 = 36.2379$ | | |
| $d_4 = 3.19$ | $nd_3 = 1.61800$ | $vd_3 = 63.39$ |
| $r_5 = 101.1640$ | | |
| $d_5 = D(5)$ (variable) | | |
| $r_6 = 261.4406$ | | |
| $d_6 = 0.60$ | $nd_4 = 1.83400$ | $vd_4 = 37.34$ |
| $r_7 = 14.0964$ | | |
| $d_7 = 2.32$ | | |
| $r_8 = -17.0702$ | | |
| $d_8 = 0.60$ | $nd_5 = 1.91082$ | $vd_5 = 35.25$ |
| $r_9 = 44.2380$ | | |
| $d_9 = 0.80$ | | |
| $r_{10} = 41.9829$ | | |
| $d_{10} = 2.32$ | $nd_6 = 1.95906$ | $vd_6 = 17.47$ |
| $r_{11} = -27.4098$ | | |
| $d_{11} = 0.60$ | $nd_7 = 1.91082$ | $vd_7 = 35.25$ |
| $r_{12} = -90.5502$ | | |
| $d_{12} = D(12)$ (variable) | | |
| $r_{13} = \infty$ (aperture stop) | | |
| $d_{13} = 0.70$ | | |
| $r_{14} = 118.3906$ (aspheric surface) | | |
| $d_{14} = 1.54$ | $nd_8 = 1.59201$ | $vd_8 = 67.02$ |
| $r_{15} = -179.2841$ (aspheric surface) | | |
| $d_{15} = 0.15$ | | |
| $r_{16} = 24.4339$ | | |
| $d_{16} = 4.03$ | $nd_9 = 1.43700$ | $vd_9 = 95.10$ |
| $r_{17} = -15.0000$ | | |
| $d_{17} = 0.60$ | $nd_{10} = 1.51680$ | $vd_{10} = 64.20$ |
| $r_{18} = 22.6483$ | | |
| $d_{18} = 0.22$ | | |
| $r_{19} = 26.6482$ | | |
| $d_{19} = 3.37$ | $nd_{11} = 1.43700$ | $vd_{11} = 95.10$ |
| $r_{20} = -23.4654$ | | |
| $d_{20} = D(20)$ (variable) | | |
| $r_{21} = 37.6075$ | | |

-continued

Focal length of entire zoom lens = 8.20 (wide angle edge) to 48.55 (fT: telephoto edge)
F number = 1.63 (wide angle edge) to 2.00 (telephoto edge)
Half-angle (ω) = 23.91 (ωW: wide angle edge) to 3.90 (ωT: telephoto edge)

| | | |
|---|---|---|
| $d_{21} = 2.35$ | $nd_{12} = 1.88300$ | $vd_{12} = 40.80$ |
| $r_{22} = -51.9172$ | | |
| $d_{22} = 0.10$ | | |
| $r_{23} = 12.0000$ | | |
| $d_{23} = 3.17$ | $nd_{13} = 1.49700$ | $vd_{13} = 81.61$ |
| $r_{24} = -120.8492$ | | |
| $d_{24} = 0.60$ | $nd_{14} = 1.69895$ | $vd_{14} = 30.05$ |
| $r_{25} = 11.8722$ | | |
| $d_{25} = D(25)$ (variable) | | |
| $r_{26} = 16.8887$ | | |
| $d_{26} = 1.22$ | $nd_{15} = 1.75211$ | $vd_{15} = 25.05$ |
| $r_{27} = 9.5626$ | | |
| $d_{27} = 4.18$ | | |
| $r_{28} = 25.0505$ | | |
| $d_{28} = 1.94$ | $nd_{16} = 1.80420$ | $vd_{16} = 46.50$ |
| $r_{29} = -83.8603$ | | |
| $d_{29} = 1.10$ | | |
| $r_{30} = \infty$ | | |
| $d_{30} = 1.50$ | $nd_{17} = 1.51633$ | $vd_{17} = 64.14$ |
| $r_{31} = \infty$ | | |
| $d_{31} = D(31)$ (variable) | | |
| $r_{32} = \infty$ (imaging plane) | | |

Constants of the cone (k) and aspheric coefficients (A, B, C, D, E)
(Fourteenth plane)

k = 1.0000,
A = 0,
B = $-2.12928 \times 10^{-6}$, C = $-7.77748 \times 10^{-7}$,
D = $8.75138 \times 10^{-9}$, E = $-1.01012 \times 10^{-10}$ (Fifteenth plane)

k = 1.0000,
A = 0,
B = $3.39892 \times 10^{-5}$, C = $-6.87094 \times 10^{-7}$,
D = $8.15498 \times 10^{-9}$, E = $-9.25682 \times 10^{-11}$ (Zoom data)

| | wide angle edge | telephoto edge |
|---|---|---|
| D(5) | 0.7523 | 23.3292 |
| D(12) | 24.0094 | 1.4324 |
| D(20) | 6.9065 | 2.5431 |
| D(25) | 1.4293 | 5.7927 |
| D(31) | 7.0025 | 6.9989 |

(Values related to conditional expression (1))
f3 (focal length of third lens group $G_{13}$) = 31.618
f3/fT = 0.65
(Values related to conditional expression (2))
ΔD4 (difference of interval between third lens group $G_{13}$ and fourth lens group $G_{14}$ at wide angle edge and interval between third lens group $G_{13}$ and fourth lens group $G_{14}$ at telephoto edge) = 4.363
ΔD4/fT = 0.09
(Values related to conditional expression (3))
β3T (zoom ratio of third lens group $G_{13}$ at telephoto edge) = −7.046
β4T (zoom ratio of fourth lens group $G_{14}$ at telephoto edge) = 0.106
β3T/β4T = −66.38
(Values related to conditional expression (4))
ν3p (Abbe number of positive lens $L_{132A}$ with respect to d-line) = 95.10
(Values related to conditional expression (5))
|Δν3BA (difference of Abbe numbers of positive lens $L_{132A}$ and negative lens $L_{132B}$ with respect to d-line)| = 30.90
(Values related to conditional expression (6))
|Δν4BA (difference of Abbe numbers of positive lens $L_{142A}$ and negative lens $L_{142B}$ with respect to d-line)| = 51.56
(Values related to conditional expression (7))
f5 (focal length of fifth lens group $G_{15}$) = 70.382
|f3/f5| = 0.45
(Values related to conditional expression (8))
f4 (focal length of fourth lens group $G_{14}$) = 29.950
|f4/f5| = 0.43
(Values related to conditional expression (9))

-continued

Focal length of entire zoom lens = 8.20 (wide angle edge) to
48.55 (fT: telephoto edge)
F number = 1.63 (wide angle edge) to 2.00 (telephoto edge)
Half-angle (ω) = 23.91 (ωW: wide angle edge) to
3.90 (ωT: telephoto edge)

N4ob (refractive index of positive lens $L_{141A}$ with respect to d-line) = 1.88300
(Values related to conditional expression (10))
θ1(W) (maximum angle of incidence of marginal ray at maximum angle of view for wide angle edge, to lens surface farthest on object side of fourth lens group $G_{14}$) = 12.746
θ1(W)/ωW = 0.53
(Values related to conditional expression (11))
θ1(T) (maximum angle of incidence of marginal ray at maximum angle of view for telephoto edge, to lens surface farthest on object side of fourth lens group $G_{14}$) = 12.914
θ1(T)/ωT = 3.31
(Values related to conditional expression (12))
ν3a (Abbe number of positive lens $L_{131}$ with respect to d-line) = 67.02

FIG. 3 is a diagram of various types of aberration occurring in the zoom lens according to the first embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 4:
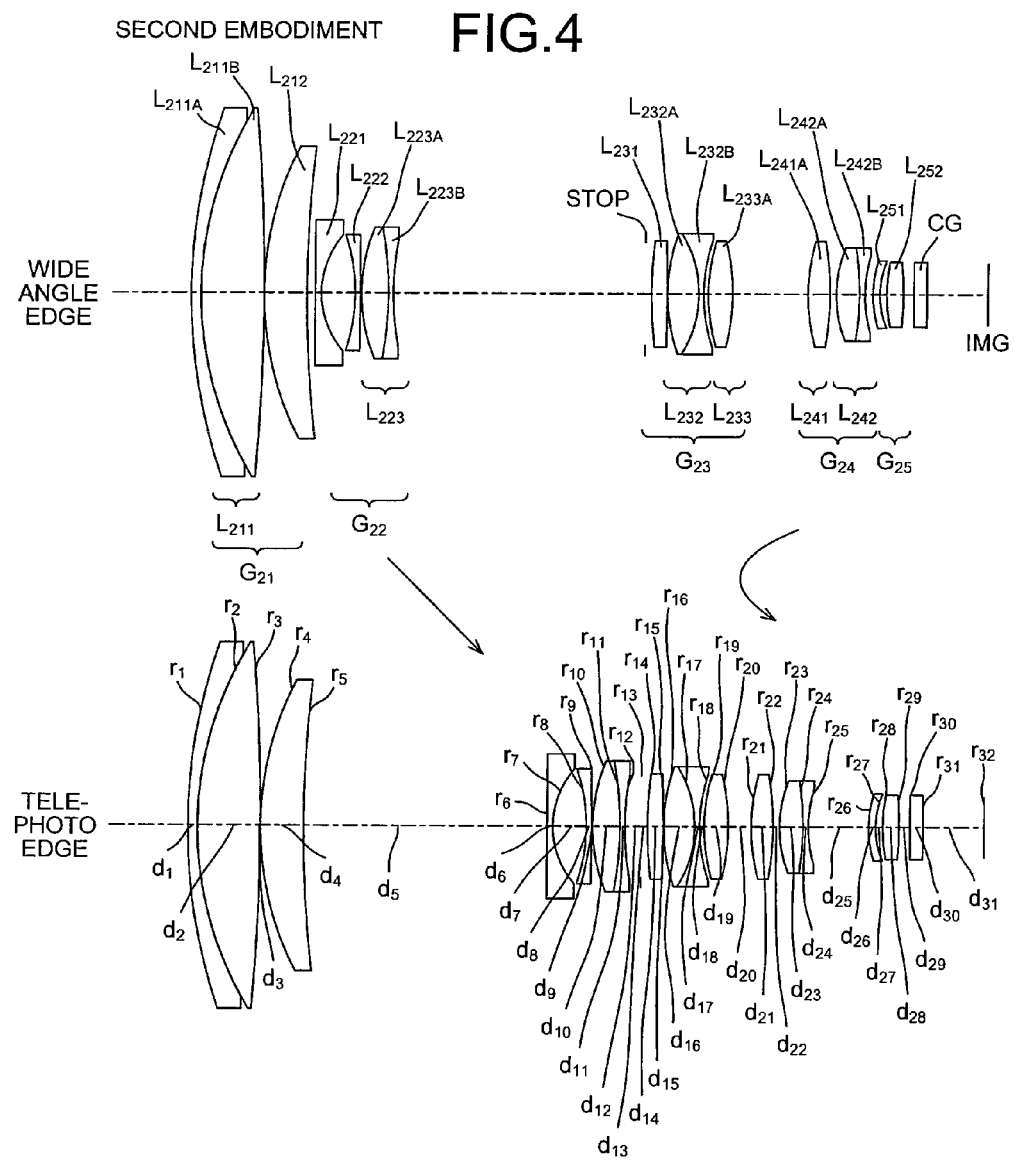
FIG. 4 is a cross sectional view (along the optical axis) of the zoom lens according to a second embodiment.

FIG. 4 is a cross sectional view (along the optical axis) of the zoom lens according to a second embodiment. The zoom lens includes sequentially from the object side, a first lens group $G_{21}$ having a positive refractive power, a second lens group $G_{22}$ having a negative refractive power, the aperture stop STOP, a third lens group $G_{23}$ having a positive refractive power, a fourth lens group $G_{24}$ having a positive refractive power, and a fifth lens group $G_{25}$ having a positive refractive power.

The cover glass CG is disposed between the fifth lens group $G_{25}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{21}$ includes sequentially from the object side, a cemented lens $L_{211}$ formed by a negative lens $L_{211A}$ and a positive lens $L_{211B}$, and a positive lens $L_{212}$.

The second lens group $G_{22}$ includes sequentially from the object side, a negative lens $L_{221}$, a negative lens $L_{222}$, and a cemented lens $L_{223}$ formed by a positive lens $L_{223A}$ and a negative lens $L_{223B}$.

The third lens group $G_{23}$ includes sequentially from the object side, a positive lens $L_{231}$, a cemented lens $L_{232}$ formed by a positive lens $L_{232A}$ and a negative lens $L_{232B}$, and a positive lens group $L_{233}$ configured by a positive lens $L_{233A}$. Both surfaces of the positive lens $L_{231}$ are aspheric.

The fourth lens group $G_{24}$ includes sequentially from the object side, a positive lens group $L_{241}$ configured by a positive lens $L_{241A}$, and a cemented lens $L_{242}$ formed by a positive lens $L_{242A}$ and a negative lens $L_{242B}$.

The fifth lens group $G_{25}$ includes sequentially from the object side, a negative lens $L_{251}$ and a positive lens $L_{252}$.

The zoom lens zooms from the wide angle edge to the telephoto edge by moving the second lens group $G_{22}$ along the optical axis, from the object side to the imaging plane IMG side. Further, the zoom lens corrects image plane variations accompanying zooming and performs focusing by moving the fourth lens group $G_{24}$ along the optical axis.

Here, various values related to the zoom lens according to the second embodiment are given.

Focal length of entire zoom lens = 5.15 (wide angle edge) to
48.55 (fT: telephoto edge)
F number = 1.64 (wide angle edge) to 2.08 (telephoto edge)
Half-angle (ω) = 35.75 (ωW: wide angle edge) to
3.83 (ωT: telephoto edge)

(Lens data)

$r_1$ = 61.0042
$d_1$ = 1.00        $nd_1$ = 1.92286        $vd_1$ = 20.88
$r_2$ = 37.7545
$d_2$ = 6.64        $nd_2$ = 1.49700        $vd_2$ = 81.61
$r_3$ = −241.1020
$d_3$ = 0.10
$r_4$ = 34.3380
$d_4$ = 4.52        $nd_3$ = 1.77250        $vd_3$ = 49.62
$r_5$ = 114.3887
$d_5$ = D(5) (variable)
$r_6$ = −918.2205
$d_6$ = 0.60        $nd_4$ = 1.90366        $vd_4$ = 31.31
$r_7$ = 9.4778
$d_7$ = 3.58
$r_8$ = −20.3807
$d_8$ = 0.60        $nd_5$ = 1.91082        $vd_5$ = 35.25
$r_9$ = −204.1198
$d_9$ = 0.10
$r_{10}$ = 18.7741
$d_{10}$ = 2.89        $nd_6$ = 1.95906        $vd_6$ = 17.47
$r_{11}$ = −42.5551
$d_{11}$ = 0.50        $nd_7$ = 1.91082        $vd_7$ = 35.25
$r_{12}$ = 31.7503
$d_{12}$ = D(12) (variable)
$r_{13}$ = ∞ (aperture stop)
$d_{13}$ = 0.60
$r_{14}$ = 38.5266 (aspheric surface)
$d_{14}$ = 1.73        $nd_8$ = 1.59201        $vd_8$ = 67.02
$r_{15}$ = −210.6287 (aspheric surface)
$d_{15}$ = 0.10
$r_{16}$ = 28.3543
$d_{16}$ = 3.30        $nd_9$ = 1.43700        $vd_9$ = 95.10
$r_{17}$ = −11.6401
$d_{17}$ = 0.60        $nd_{10}$ = 1.51680        $vd_{10}$ = 64.20
$r_{18}$ = 19.5588
$d_{18}$ = 0.30
$r_{19}$ = 25.0000
$d_{19}$ = 2.54        $nd_{11}$ = 1.43700        $vd_{11}$ = 95.10
$r_{20}$ = −27.3642
$d_{20}$ = D(20) (variable)
$r_{21}$ = 24.5852
$d_{21}$ = 2.27        $nd_{12}$ = 1.88300        $vd_{12}$ = 40.80
$r_{22}$ = −40.8401
$d_{22}$ = 0.71
$r_{23}$ = 14.2305
$d_{23}$ = 2.51        $nd_{13}$ = 1.49700        $vd_{13}$ = 81.61
$r_{24}$ = −30.0524
$d_{24}$ = 0.60        $nd_{14}$ = 1.75520        $vd_{14}$ = 27.53
$r_{25}$ = 15.3708
$d_{25}$ = D(25) (variable)
$r_{26}$ = 12.3841
$d_{26}$ = 0.60        $nd_{15}$ = 1.80809        $vd_{15}$ = 22.76
$r_{27}$ = 7.4242
$d_{27}$ = 0.84
$r_{28}$ = 19.0999
$d_{28}$ = 1.78        $nd_{16}$ = 1.77250        $vd_{16}$ = 49.62
$r_{29}$ = −129.1950
$d_{29}$ = 1.10
$r_{30}$ = ∞
$d_{30}$ = 1.50        $nd_{17}$ = 1.51633        $vd_{17}$ = 64.14
$r_{31}$ = ∞
$d_{31}$ = D(31) (variable)
$r_{32}$ = ∞ (imaging plane)

Constants of the cone (k) and aspheric
coefficients (A, B, C, D, E)
(Fourteenth plane)

k = 1.0000,
A = 0,
B = −3.59592 × $10^{-5}$, C = −3.16856 × $10^{-7}$,
D = 1.98370 × $10^{-9}$, E = −6.42721 × $10^{-12}$

-continued

Focal length of entire zoom lens = 5.15 (wide angle edge) to
48.55 (fT: telephoto edge)
F number = 1.64 (wide angle edge) to 2.08 (telephoto edge)
Half-angle (ω) = 35.75 (ωW: wide angle edge) to
3.83 (ωT: telephoto edge)

(Fifteenth plane)

k = 1.0000,
A = 0,
B = 1.02798 × 10$^{-5}$, C = −3.44988 × 10$^{-7}$,
D = 4.11310 × 10$^{-9}$, E = −4.57401 × 10$^{-11}$ (Zoom data)

| | wide angle edge | telephoto edge |
|---|---|---|
| D(5) | 0.9881 | 26.0839 |
| D(12) | 26.8957 | 1.8000 |
| D(20) | 8.1129 | 2.5476 |
| D(25) | 0.8770 | 6.4423 |
| D(31) | 6.4852 | 6.4880 |

(Values related to conditional expression (1))
f3 (focal length of third lens group $G_{23}$) = 30.520
3/fT = 0.63
(Values related to conditional expression (2))
ΔD4 (difference of interval between third lens group $G_{23}$ and fourth lens group $G_{24}$ at wide angle edge and interval between third lens group $G_{23}$ and fourth lens group $G_{24}$ at telephoto edge) = 5.565
ΔD4/fT = 0.11
(Values related to conditional expression (3))
β3T (zoom ratio of third lens group $G_{23}$ at telephoto edge) = 14.816
β4T (zoom ratio of fourth lens group $G_{24}$ at telephoto edge) = −0.054
β3T/β4T = −273.26
(Values related to conditional expression (4))
ν3p (Abbe number of positive lens $L_{232A}$ with respect to d-line) = 95.10
(Values related to conditional expression (5))
|Δν3BA| (difference of Abbe numbers of positive lens $L_{232A}$ and negative lens $L_{232B}$ with respect to d-line)| = 30.90
(Values related to conditional expression (6))
|Δν4BA| (difference of Abbe numbers of positive lens $L_{242A}$ and negative lens $L_{242B}$ with respect to d-line)| = 54.08
(Values related to conditional expression (7))
f5 (focal length of fifth lens group $G_{25}$) = 172.657
|f3/f5| = 0.18
(Values related to conditional expression (8))
f4 (focal length of fourth lens group $G_{24}$) = 21.902
|f4/f5| = 0.13
(Values related to conditional expression (9))
N4ob (refractive index of positive lens $L_{241A}$ with respect to d-line) = 1.88300
(Values related to conditional expression (10))
θ1(W) (maximum angle of incidence of marginal ray at maximum angle of view for wide angle edge, to lens surface farthest on object side of fourth lens group $G_{24}$) = 18.324
θ1(W)/ωW = 0.51
(Values related to conditional expression (11))
θ1(T) (maximum angle of incidence of marginal ray at maximum angle of view for telephoto edge, to lens surface farthest on object side of fourth lens group $G_{24}$) = 19.088
θ1(T)/ωT = 4.98
(Values related to conditional expression (12))
ν3a (Abbe number of positive lens $L_{231}$ with respect to d-line) = 67.02

FIG. 5 is a diagram of various types of aberration occurring in the zoom lens according to the second embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 6:
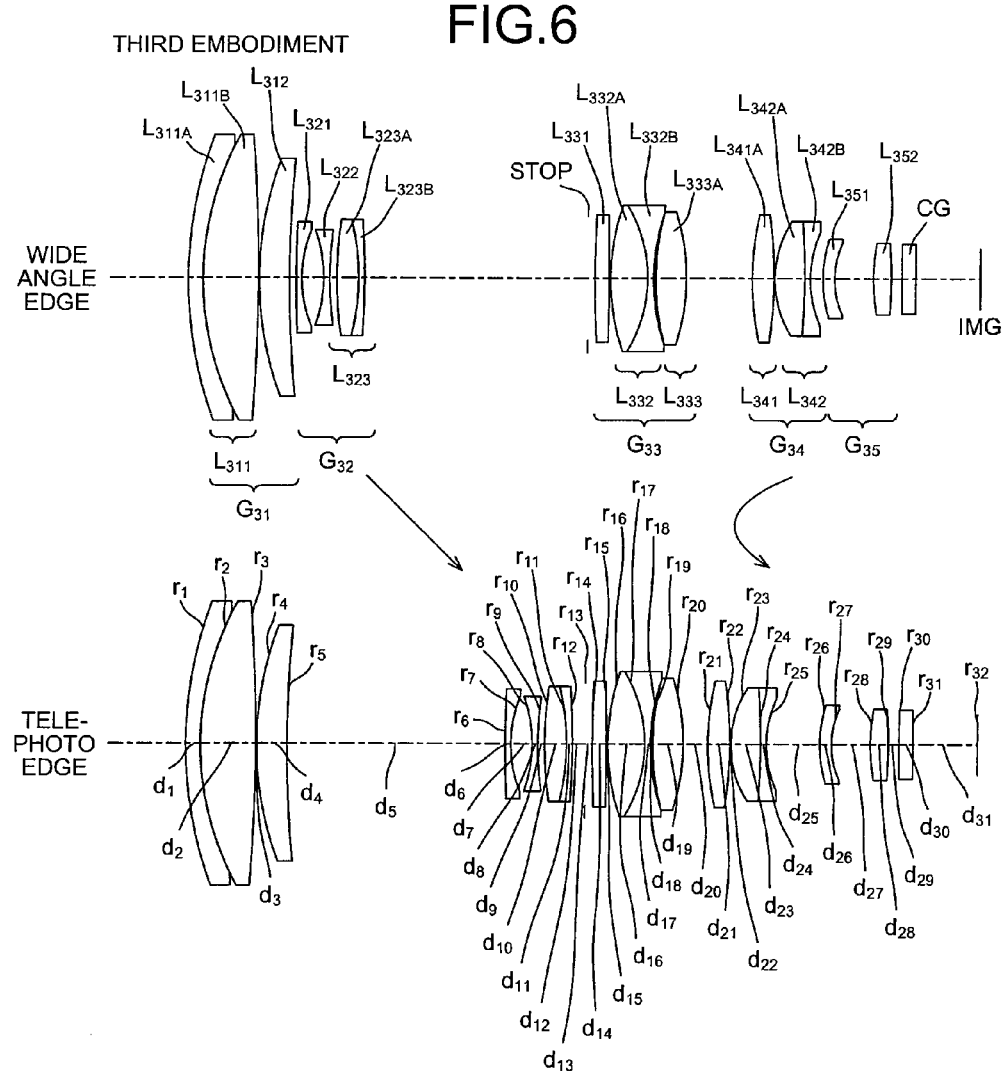
FIG. 6 is a cross sectional view (along the optical axis) of the zoom lens according to a third embodiment.

FIG. 6 is a cross sectional view (along the optical axis) of the zoom lens according to a third embodiment. The zoom lens includes sequentially from the object side, a first lens group $G_{31}$ having a positive refractive power, a second lens group $G_{32}$ having a negative refractive power, the aperture stop STOP, a third lens group $G_{33}$ having a positive refractive power, a fourth lens group $G_{34}$ having a positive refractive power, and a fifth lens group $G_{35}$ having a positive refractive power.

The cover glass CG is disposed between the fifth lens group $G_{35}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{31}$ includes sequentially from the object side, a cemented lens $L_{311}$ formed by a negative lens $L_{311A}$ and a positive lens $L_{311B}$, and a positive lens $L_{312}$.

The second lens group $G_{32}$ includes sequentially from the object side, a negative lens $L_{321}$, a negative lens $L_{322}$, and a cemented lens $L_{323}$ formed by a positive lens $L_{323A}$ and a negative lens $L_{323B}$.

The third lens group $G_{33}$ includes sequentially from the object side, a positive lens $L_{331}$, a cemented lens $L_{332}$ formed by a positive lens $L_{332A}$ and a negative lens $L_{332B}$, and a positive lens group $L_{333}$ configured by a positive lens $L_{333A}$. Both surfaces of the positive lens $L_{331}$ are aspheric.

The fourth lens group $G_{34}$ includes sequentially from the object side, a positive lens group $L_{341}$ configured by a positive lens $L_{341A}$, and a cemented lens $L_{342}$ formed by a positive lens $L_{342A}$ and a negative lens $L_{342B}$.

The fifth lens group $G_{35}$ includes sequentially from the object side, a negative lens $L_{351}$ and a positive lens $L_{352}$.

The zoom lens zooms from the wide angle edge to the telephoto edge by moving the second lens group $G_{32}$ along the optical axis, from the object side to the imaging plane IMG side. Further, the zoom lens corrects image plane variations accompanying zooming and performs focusing by moving the fourth lens group $G_{34}$ along the optical axis.

Here, various values related to the zoom lens according to the third embodiment are given.

Focal length of entire zoom lens = 8.20 (wide angle edge) to
48.54 (fT: telephoto edge)
F number = 1.63 (wide angle edge) to 2.00 (telephoto edge)
Half-angle (ω) = 23.86 (ωW: wide angle edge) to
3.90 (ωT: telephoto edge)

(Lens data)

| | | |
|---|---|---|
| $r_1$ = 47.1899 | | |
| $d_1$ = 1.50 | $nd_1$ = 1.80809 | $vd_1$ = 22.76 |
| $r_2$ = 32.0220 | | |
| $d_2$ = 5.95 | $nd_2$ = 1.49700 | $vd_2$ = 81.61 |
| $r_3$ = −187.3214 | | |
| $d_3$ = 0.15 | | |
| $r_4$ = 35.6965 | | |
| $d_4$ = 3.36 | $nd_3$ = 1.61800 | $vd_3$ = 63.39 |
| $r_5$ = 110.1448 | | |
| $d_5$ = D(5) (variable) | | |
| $r_6$ = 337.0936 | | |
| $d_6$ = 0.60 | $nd_4$ = 1.83400 | $vd_4$ = 37.34 |
| $r_7$ = 13.7198 | | |
| $d_7$ = 2.33 | | |
| $r_8$ = −16.8276 | | |
| $d_8$ = 0.60 | $nd_5$ = 1.91082 | $vd_5$ = 35.25 |
| $r_9$ = 53.7401 | | |
| $d_9$ = 0.88 | | |
| $r_{10}$ = 46.2473 | | |
| $d_{10}$ = 2.30 | $nd_6$ = 1.95906 | $vd_6$ = 17.47 |
| $r_{11}$ = −26.4043 | | |
| $d_{11}$ = 0.60 | $nd_7$ = 1.91082 | $vd_7$ = 35.25 |
| $r_{12}$ = −85.3324 | | |
| $d_{12}$ = D(12) (variable) | | |
| $r_{13}$ = ∞ (aperture stop) | | |
| $d_{13}$ = 0.70 | | |
| $r_{14}$ = 118.9072 (aspheric surface) | | |
| $d_{14}$ = 1.54 | $nd_8$ = 1.59201 | $vd_8$ = 67.02 |
| $r_{15}$ = −182.9621 (aspheric surface) | | |
| $d_{15}$ = 0.15 | | |
| $r_{16}$ = 23.8562 | | |
| $d_{16}$ = 4.09 | $nd_9$ = 1.43700 | $vd_9$ = 95.10 |
| $r_{17}$ = −15.0000 | | |

-continued

Focal length of entire zoom lens = 8.20 (wide angle edge) to
48.54 (fT: telephoto edge)
F number = 1.63 (wide angle edge) to 2.00 (telephoto edge)
Half-angle (ω) = 23.86 (ωW: wide angle edge) to
3.90 (ωT: telephoto edge)

| | | |
|---|---|---|
| $d_{17} = 0.60$ | $nd_{10} = 1.51680$ | $vd_{10} = 64.20$ |
| $r_{18} = 22.6762$ | | |
| $d_{18} = 0.22$ | | |
| $r_{19} = 26.6763$ | | |
| $d_{19} = 3.37$ | $nd_{11} = 1.43700$ | $vd_{11} = 95.10$ |
| $r_{20} = -23.9158$ | | |
| $d_{20} = D(20)$ (variable) | | |
| $r_{21} = 35.6233$ | | |
| $d_{21} = 2.40$ | $nd_{12} = 1.88100$ | $vd_{12} = 40.14$ |
| $r_{22} = -51.9680$ | | |
| $d_{22} = 0.10$ | | |
| $r_{23} = 12.0000$ | | |
| $d_{23} = 3.23$ | $nd_{13} = 1.49700$ | $vd_{13} = 81.61$ |
| $r_{24} = -73.8380$ | | |
| $d_{24} = 0.60$ | $nd_{14} = 1.69895$ | $vd_{14} = 30.05$ |
| $r_{25} = 11.7130$ | | |
| $d_{25} = D(25)$ (variable) | | |
| $r_{26} = 16.6317$ | | |
| $d_{26} = 0.98$ | $nd_{15} = 1.78472$ | $vd_{15} = 25.72$ |
| $r_{27} = 9.6558$ | | |
| $d_{27} = 4.33$ | | |
| $r_{28} = 25.2826$ | | |
| $d_{28} = 2.01$ | $nd_{16} = 1.80420$ | $vd_{16} = 46.50$ |
| $r_{29} = -79.5754$ | | |
| $d_{29} = 1.10$ | | |
| $r_{30} = \infty$ | | |
| $d_{30} = 1.50$ | $nd_{17} = 1.51633$ | $vd_{17} = 64.14$ |
| $r_{31} = \infty$ | | |
| $d_{31} = D(31)$ (variable) | | |
| $r_{32} = \infty$ (imaging plane) | | |

Constants of the cone (k) and aspheric
coefficients (A, B, C, D, E)
(Fourteenth plane)

k = 1.0000,
A = 0,
B = -2.00106 × 10⁻⁶, C = -7.82793 × 10⁻⁷,
D = 8.89401 × 10⁻⁹, E = -1.01643 × 10⁻¹⁰
(Fifteenth plane)

k = 1.0000,
A = 0,
B = 3.34679 × 10⁻⁵, C = -6.78233 × 10⁻⁷,
D = 7.94663 × 10⁻⁹, E = -8.90983 × 10⁻¹¹

(Zoom data)

| | wide angle edge | telephoto edge |
|---|---|---|
| D(5) | 0.7484 | 23.1722 |
| D(12) | 23.8412 | 1.4173 |
| D(20) | 6.8128 | 2.5912 |
| D(25) | 1.4233 | 5.6449 |
| D(31) | 7.0053 | 6.9981 |

(Values related to conditional expression (1))
f3 (focal length of third lens group $G_{33}$) = 31.604
f3/fT = 0.65
(Values related to conditional expression (2))
ΔD4 (difference of interval between third lens group $G_{33}$ and fourth lens group $G_{34}$ at wide angle edge and interval between third lens group $G_{33}$ and fourth lens group $G_{34}$ at telephoto edge) = 4.222
ΔD4/fT = 0.09
(Values related to conditional expression (3))
β3T (zoom ratio of third lens group $G_{33}$ at telephoto edge) = -6.817
β4T (zoom ratio of fourth lens group $G_{34}$ at telephoto edge) = 0.109
β3T/β4T = -62.74
(Values related to conditional expression (4))
v3p (Abbe number of positive lens $L_{332A}$ with respect to d-line) = 95.10
(Values related to conditional expression (5))
|Δv3BA (difference of Abbe numbers of positive lens $L_{332A}$ and negative lens $L_{332B}$ with respect to d-line)| = 30.90
(Values related to conditional expression (6))

-continued

Focal length of entire zoom lens = 8.20 (wide angle edge) to
48.54 (fT: telephoto edge)
F number = 1.63 (wide angle edge) to 2.00 (telephoto edge)
Half-angle (ω) = 23.86 (ωW: wide angle edge) to
3.90 (ωT: telephoto edge)

|Δv4BA (difference of Abbe numbers of positive lens $L_{342A}$ and negative lens $L_{342B}$ with respect to d-line) = 51.56
(Values related to conditional expression (7))
f5 (focal length of fifth lens group $G_{35}$) = 68.467
|f3/f5| = 0.46
(Values related to conditional expression (8))
f4 (focal length of fourth lens group $G_{34}$) = 29.863
|f4/f5| = 0.44
(Values related to conditional expression (9))
N4ob (refractive index of positive lens $L_{341A}$ with respect to d-line) = 1.88100
(Values related to conditional expression (10))
θ1(W) (maximum angle of incidence of marginal ray at maximum angle of view for wide angle edge, to lens surface farthest on object side of fourth lens group $G_{34}$) = 13.040
θ1(W)/ωW = 0.55
(Values related to conditional expression (11))
θ1(T) (maximum angle of incidence of marginal ray at maximum angle of view for telephoto edge, to lens surface farthest on object side of fourth lens group $G_{34}$) = 13.236
θ1(T)/ωT = 3.39
(Values related to conditional expression (12))
v3a (Abbe number of positive lens $L_{331}$ with respect to d-line) = 67.02

FIG. 7 is a diagram of various types of aberration occurring in the zoom lens according to the third embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 8:
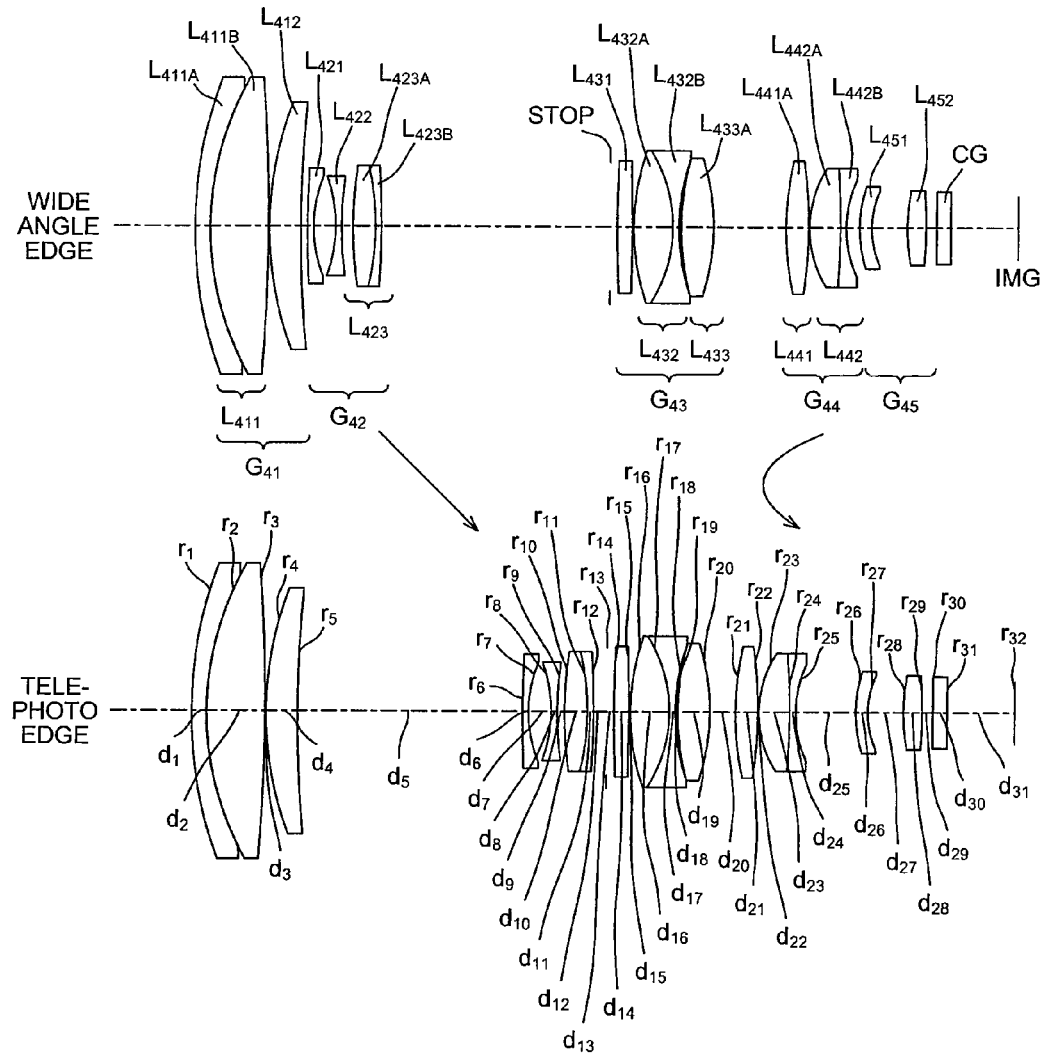
FIG. 8 is a cross sectional view (along the optical axis) of the zoom lens according to a fourth embodiment.

FIG. 8 is a cross sectional view (along the optical axis) of the zoom lens according to a fourth embodiment. The zoom lens includes sequentially from the object side, a first lens group $G_{41}$ having a positive refractive power, a second lens group $G_{42}$ having a negative refractive power, the aperture stop STOP, a third lens group $G_{43}$ having a positive refractive power, a fourth lens group $G_{44}$ having a positive refractive power, and a fifth lens group $G_{45}$ having a positive refractive power.

The cover glass CG is disposed between the fifth lens group $G_{45}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{41}$ includes sequentially from the object side, a cemented lens $L_{411}$ formed by a negative lens $L_{411A}$ and a positive lens $L_{411B}$, and a positive lens $L_{412}$.

The second lens group $G_{42}$ includes sequentially from the object side, a negative lens $L_{421}$, a negative lens $L_{422}$, and a cemented lens $L_{423}$ formed by a positive lens $L_{423A}$ and a negative lens $L_{423B}$.

The third lens group $G_{43}$ includes sequentially from the object side, a positive lens $L_{431}$, a cemented lens $L_{432}$ formed by a positive lens $L_{432A}$ and a negative lens $L_{432B}$, and a positive lens group $L_{433}$ configured by a positive lens $L_{433A}$. Both surfaces of the positive lens $L_{431}$ as aspheric.

The fourth lens group $G_{44}$ includes sequentially from the object side, a positive lens group $L_{441}$ configured by a positive lens $L_{441A}$, and a cemented lens $L_{442}$ formed by a positive lens $L_{442A}$ and a negative lens $L_{442B}$.

The fifth lens group $G_{45}$ includes sequentially from the object side, a negative lens $L_{451}$ and a positive lens $L_{452}$.

The zoom lens zooms from the wide angle edge to the telephoto edge by moving the second lens group $G_{42}$ along the optical axis, from the object side to the imaging plane IMG side. Further, the zoom lens corrects image plane variations accompanying zooming and performs focusing by moving the fourth lens group $G_{44}$ along the optical axis.

Here, various values related to the zoom lens according to the fourth embodiment are given.

Focal length of entire zoom lens = 8.20 (wide angle edge) to 48.55 (fT: telephoto edge)
F number = 1.63 (wide angle edge) to 2.00 (telephoto edge)
Half-angle (ω) = 23.89 (ωW: wide angle edge) to 3.90 (ωT: telephoto edge)

(Lens data)

| | | | |
|---|---|---|---|
| $r_1$ = 44.7887 | $d_1$ = 1.50 | $nd_1$ = 1.80809 | $υd_1$ = 22.76 |
| $r_2$ = 30.9280 | $d_2$ = 6.10 | $nd_2$ = 1.49700 | $υd_2$ = 81.61 |
| $r_3$ = −191.6351 | $d_3$ = 0.15 | | |
| $r_4$ = 35.8816 | $d_4$ = 3.26 | $nd_3$ = 1.61800 | $υd_3$ = 63.39 |
| $r_5$ = 102.7000 | $d_5$ = D(5) (variable) | | |
| $r_6$ = 286.7781 | $d_6$ = 0.60 | $nd_4$ = 1.83400 | $υd_4$ = 37.34 |
| $r_7$ = 14.0223 | $d_7$ = 2.29 | | |
| $r_8$ = −17.0784 | $d_8$ = 0.60 | $nd_5$ = 1.91082 | $υd_5$ = 35.25 |
| $r_9$ = 50.3221 | $d_9$ = 0.98 | | |
| $r_{10}$ = 46.1600 | $d_{10}$ = 2.31 | $nd_6$ = 1.95906 | $υd_6$ = 17.47 |
| $r_{11}$ = −25.8017 | $d_{11}$ = 0.60 | $nd_7$ = 1.91082 | $υd_7$ = 35.25 |
| $r_{12}$ = −105.9951 | $d_{12}$ = D(12) (variable) | | |
| $r_{13}$ = ∞ (aperture stop) | $d_{13}$ = 0.70 | | |
| $r_{14}$ = 97.5331 (aspheric surface) | $d_{14}$ = 1.59 | $nd_8$ = 1.49710 | $υd_8$ = 81.56 |
| $r_{15}$ = −148.7928 (aspheric surface) | $d_{15}$ = 0.15 | | |
| $r_{16}$ = 23.9275 | $d_{16}$ = 4.10 | $nd_9$ = 1.43700 | $υd_9$ = 95.10 |
| $r_{17}$ = −15.0000 | $d_{17}$ = 0.60 | $nd_{10}$ = 1.51680 | $υd_{10}$ = 64.20 |
| $r_{18}$ = 24.4354 | $d_{18}$ = 0.22 | | |
| $r_{19}$ = 29.7966 | $d_{19}$ = 3.33 | $nd_{11}$ = 1.43700 | $υd_{11}$ = 95.10 |
| $r_{20}$ = −22.7200 | $d_{20}$ = D(20) (variable) | | |
| $r_{21}$ = 37.4362 | $d_{21}$ = 2.33 | $nd_{12}$ = 1.88100 | $υd_{12}$ = 40.14 |
| $r_{22}$ = −54.2128 | $d_{22}$ = 0.10 | | |
| $r_{23}$ = 12.0000 | $d_{23}$ = 3.21 | $nd_{13}$ = 1.49700 | $υd_{13}$ = 81.61 |
| $r_{24}$ = −91.7837 | $d_{24}$ = 0.60 | $nd_{14}$ = 1.69895 | $υd_{14}$ = 30.05 |
| $r_{25}$ = 11.7513 | $d_{25}$ = D(25) (variable) | | |
| $r_{26}$ = 16.9215 | $d_{26}$ = 1.45 | $nd_{15}$ = 1.78472 | $υd_{15}$ = 25.72 |
| $r_{27}$ = 9.5749 | $d_{27}$ = 3.64 | | |
| $r_{28}$ = 25.4027 | $d_{28}$ = 1.93 | $nd_{16}$ = 1.80420 | $υd_{16}$ = 46.50 |
| $r_{29}$ = −74.6561 | $d_{29}$ = 1.10 | | |
| $r_{30}$ = ∞ | $d_{30}$ = 1.50 | $nd_{17}$ = 1.51633 | $υd_{17}$ = 64.14 |
| $r_{31}$ = ∞ | $d_{31}$ = D(31) (variable) | | |
| $r_{32}$ = ∞ (imaging plane) | | | |

Constants of the cone (k) and aspheric coefficients (A, B, C, D, E)

(Fourteenth plane)

k = 1.0000,
A = 0,
B = −6.47823 × 10$^{-6}$, C = −7.91552 × 10$^{-7}$,
D = 8.80330 × 10$^{-9}$, E = −1.06765 × 10$^{-10}$ (Fifteenth plane)

k = 1.0000,
A = 0,
B = 3.71329 × 10$^{-5}$, C = −6.68736 × 10$^{-7}$,
D = 7.62957 × 10$^{-9}$, E = −9.12856 × 10$^{-11}$ (Zoom data)

| | wide angle edge | telephoto edge |
|---|---|---|
| D(5) | 0.7535 | 23.0015 |
| D(12) | 23.7008 | 1.4529 |
| D(20) | 7.1592 | 2.5765 |
| D(25) | 1.4398 | 6.0225 |
| D(31) | 7.0046 | 7.0012 |

-continued

Focal length of entire zoom lens = 8.20 (wide angle edge) to 48.55 (fT: telephoto edge)
F number = 1.63 (wide angle edge) to 2.00 (telephoto edge)
Half-angle (ω) = 23.89 (ωW: wide angle edge) to 3.90 (ωT: telephoto edge)

(Values related to conditional expression (1))
f3 (focal length of third lens group $G_{43}$) = 30.724
f3/fT = 0.63
(Values related to conditional expression (2))
ΔD4 (difference of interval between third lens group $G_{43}$ and fourth lens group $G_{44}$ at wide angle edge and interval between third lens group $G_{43}$ and fourth lens group $G_{44}$ at telephoto edge) = 4.583
ΔD4/fT = 0.09
(Values related to conditional expression (3))
β3T (zoom ratio of third lens group $G_{43}$ at telephoto edge) = −5.896
β4T (zoom ratio of fourth lens group $G_{44}$ at telephoto edge) = 0.130
β3T/β4T = −45.32
(Values related to conditional expression (4))
υ3p (Abbe number of positive lens $L_{432A}$ with respect to d-line) = 95.10
(Values related to conditional expression (5))
|Δυ3BA (difference of Abbe numbers of positive lens $L_{432A}$ and negative lens $L_{432B}$ with respect to d-line)| = 30.90
(Values related to conditional expression (6))
|Δυ4BA (difference of Abbe numbers of positive lens $L_{442A}$ and negative lens $L_{442B}$ with respect to d-line)| = 51.56
(Values related to conditional expression (7))
f5 (focal length of fifth lens group $G_{45}$) = 74.971
|f3/f5| = 0.41
(Values related to conditional expression (8))
f4 (focal length of fourth lens group $G_{44}$) = 31.416
|f4/f5| = 0.42
(Values related to conditional expression (9))
N4ob (refractive index of positive lens $L_{441A}$ with respect to d-line) = 1.88100
(Values related to conditional expression (10))
θ1(W) (maximum angle of incidence of marginal ray at maximum angle of view for wide angle edge, to lens surface farthest on object side of fourth lens group $G_{44}$) = 12.576
θ1(W)/ωW = 0.53
(Values related to conditional expression (11))
θ1(T) (maximum angle of incidence of marginal ray at maximum angle of view for telephoto edge, to lens surface farthest on object side of fourth lens group $G_{44}$) = 12.716
θ1(T)/ωT = 3.26
(Values related to conditional expression (12))
υ3a (Abbe number of positive lens $L_{431}$ with respect to d-line) = 81.56

FIG. 9 is a diagram of various types of aberration occurring in the zoom lens according to the fourth embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 10:
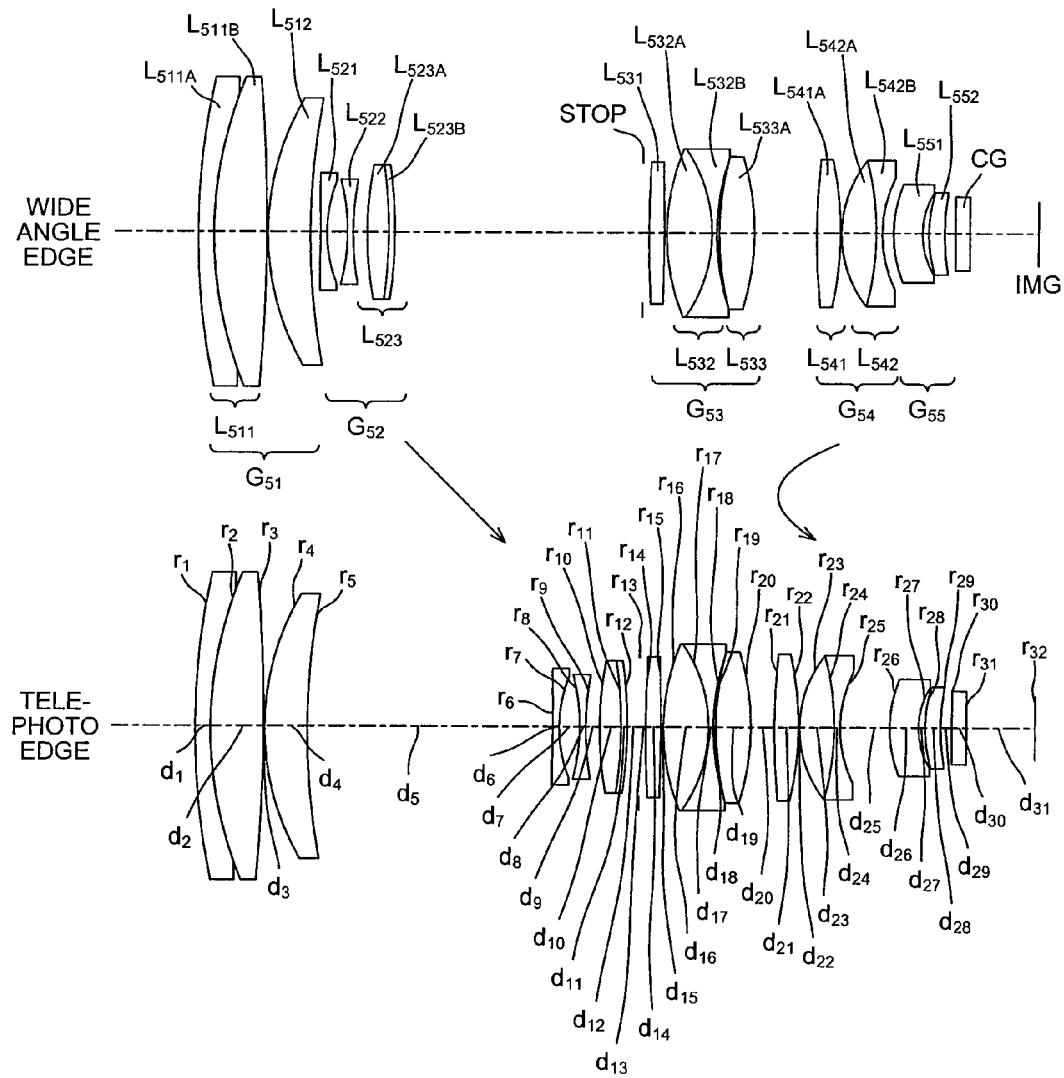
FIG. 10 is a cross sectional view (along the optical axis) of the zoom lens according to a fifth embodiment.

FIG. 10 is a cross sectional view (along the optical axis) of the zoom lens according to a fifth embodiment. The zoom lens includes sequentially from the object side, a first lens group $G_{51}$ having a positive refractive power, a second lens group $G_{52}$ having a negative refractive power, the aperture stop STOP, a third lens group $G_{53}$ having a positive refractive power, a fourth lens group $G_{54}$ having a positive refractive power, and a fifth lens group $G_{55}$ having a negative refractive power.

The cover glass CG is disposed between the fifth lens group $G_{55}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{51}$ includes sequentially from the object side, a cemented lens $L_{511}$ formed by a negative lens $L_{511A}$ and a positive lens $L_{511B}$, and a positive lens $L_{512}$.

The second lens group $G_{52}$ includes sequentially from the object side, a negative lens $L_{521}$, a negative lens $L_{522}$, and a cemented lens $L_{523}$ formed by a positive lens $L_{523A}$ and a negative lens $L_{523B}$.

The third lens group $G_{53}$ includes sequentially from the object side, a positive lens $L_{531}$, a cemented lens $L_{532}$ formed by a positive lens $L_{532A}$ and a negative lens $L_{532B}$, and a positive lens group $L_{533}$ configured by a positive lens $L_{533A}$. Both surfaces of the positive lens $L_{531}$ are aspheric.

The fourth lens group $G_{54}$ includes sequentially from the object side, a positive lens group $L_{541}$ configured by a positive lens $L_{541A}$, and a cemented lens $L_{542}$ formed by a positive lens $L_{542A}$ and a negative lens $L_{542B}$.

The fifth lens group $G_{55}$ includes sequentially from the object side, a negative lens $L_{551}$ and a positive lens $L_{552}$.

The zoom lens zooms from the wide angle edge to the telephoto edge by moving the second lens group $G_{52}$ along the optical axis, from the object side to the imaging plane IMG side. Further, the zoom lens corrects image plane variations accompanying zooming and performs focusing by moving the fourth lens group $G_{54}$ along the optical axis.

Here, various values related to the zoom lens according to the fifth embodiment are given.

Focal length of entire zoom lens = 8.20 (wide angle edge) to 48.55 (fT: telephoto edge)
F number = 1.63 (wide angle edge) to 1.95 (telephoto edge)
Half-angle ($\omega$) = 21.22 ($\omega$W: wide angle edge) to 3.49 ($\omega$T: telephoto edge)

(Lens data)

| | | | |
|---|---|---|---|
| $r_1 = 75.0780$ | $d_1 = 1.50$ | $nd_1 = 1.80809$ | $\upsilon d_1 = 22.76$ |
| $r_2 = 41.9370$ | $d_2 = 5.31$ | $nd_2 = 1.49700$ | $\upsilon d_2 = 81.61$ |
| $r_3 = -172.4947$ | $d_3 = 0.15$ | | |
| $r_4 = 27.0291$ | $d_4 = 4.28$ | $nd_3 = 1.61800$ | $\upsilon d_3 = 63.39$ |
| $r_5 = 70.4905$ | $d_5 = D(5)$ (variable) | | |
| $r_6 = -183.3764$ | $d_6 = 0.60$ | $nd_4 = 1.83400$ | $\upsilon d_4 = 37.34$ |
| $r_7 = 14.0306$ | $d_7 = 2.11$ | | |
| $r_8 = -19.9714$ | $d_8 = 0.60$ | $nd_5 = 1.91082$ | $\upsilon d_5 = 35.25$ |
| $r_9 = 27.2898$ | $d_9 = 1.45$ | | |
| $r_{10} = 37.6827$ | $d_{10} = 2.14$ | $nd_6 = 1.95906$ | $\upsilon d_6 = 17.47$ |
| $r_{11} = -46.3339$ | $d_{11} = 0.60$ | $nd_7 = 1.91082$ | $\upsilon d_7 = 35.25$ |
| $r_{12} = -51.6529$ | $d_{12} = D(12)$ (variable) | | |
| $r_{13} = \infty$ (aperture stop) | $d_{13} = 0.70$ | | |
| $r_{14} = 104.9292$ (aspheric surface) | $d_{14} = 1.57$ | $nd_8 = 1.59201$ | $\upsilon d_8 = 67.02$ |
| $r_{15} = -183.3560$ (aspheric surface) | $d_{15} = 0.15$ | | |
| $r_{16} = 21.5309$ | $d_{16} = 4.60$ | $nd_9 = 1.43700$ | $\upsilon d_9 = 95.10$ |
| $r_{17} = -15.0000$ | $d_{17} = 0.60$ | $nd_{10} = 1.51680$ | $\upsilon d_{10} = 64.20$ |
| $r_{18} = 22.6000$ | $d_{18} = 0.20$ | | |
| $r_{19} = 26.7000$ | $d_{19} = 3.44$ | $nd_{11} = 1.43700$ | $\upsilon d_{11} = 95.10$ |
| $r_{20} = -26.7055$ | $d_{20} = D(20)$ (variable) | | |
| $r_{21} = 76.7163$ | $d_{21} = 2.45$ | $nd_{12} = 1.88300$ | $\upsilon d_{12} = 40.80$ |
| $r_{22} = -30.7570$ | $d_{22} = 0.10$ | | |
| $r_{23} = 12.0000$ | $d_{23} = 3.54$ | $nd_{13} = 1.49700$ | $\upsilon d_{13} = 81.61$ |
| $r_{24} = -31.0371$ | $d_{24} = 0.60$ | $nd_{14} = 1.69895$ | $\upsilon d_{14} = 30.05$ |
| $r_{25} = -12.8063$ | $d_{25} = D(25)$ (variable) | | |
| $r_{26} = 14.1108$ | $d_{26} = 2.90$ | $nd_{15} = 1.75211$ | $\upsilon d_{15} = 25.05$ |
| $r_{27} = 7.8563$ | $d_{27} = 0.65$ | | |
| $r_{28} = 13.4850$ | $d_{28} = 1.57$ | $nd_{16} = 1.80420$ | $\upsilon d_{16} = 46.50$ |
| $r_{29} = 20.5566$ | $d_{29} = 1.10$ | | |
| $r_{30} = \infty$ | $d_{30} = 1.50$ | $nd_{17} = 1.51633$ | $\upsilon d_{17} = 64.14$ |
| $r_{31} = \infty$ | $d_{31} = D(31)$ (variable) | | |
| $r_{32} = \infty$ (imaging plane) | | | |

Constants of the cone (k) and aspheric coefficients (A, B, C, D, E)

(Fourteenth plane)

k = 1.0000,
A = 0,
B = $-7.12299 \times 10^{-6}$, C = $-7.59779 \times 10^{-7}$,
D = $8.48959 \times 10^{-9}$, E = $-6.53913 \times 10^{-11}$ (Fifteenth plane)

k = 1.0000,
A = 0,
B = $2.94243 \times 10^{-5}$, C = $-6.10954 \times 10^{-7}$,
D = $8.19549 \times 10^{-9}$, E = $-6.19786 \times 10^{-11}$ (Zoom data)

| | wide angle edge | telephoto edge |
|---|---|---|
| D(5) | 1.0191 | 24.9183 |
| D(12) | 25.1642 | 1.2649 |
| D(20) | 6.2311 | 2.3323 |
| D(25) | 1.1651 | 5.0639 |
| D(31) | 6.9688 | 6.9268 |

(Values related to conditional expression (1))
f3 (focal length of third lens group $G_{53}$) = 31.000
f3/fT = 0.64
(Values related to conditional expression (2))
ΔD4 (difference of interval between third lens group $G_{53}$ and fourth lens group $G_{54}$ at wide angle edge and interval between third lens group $G_{53}$ and fourth lens group $G_{54}$ at telephoto edge) = 3.898
ΔD4/fT = 0.08
(Values related to conditional expression (3))
β3T (zoom ratio of third lens group $G_{53}$ at telephoto edge) = $-4.290$
β4T (zoom ratio of fourth lens group $G_{54}$ at telephoto edge) = 0.156
β3T/β4T = $-27.47$
(Values related to conditional expression (4))
$\upsilon$3p (Abbe number of positive lens $L_{532A}$ with respect to d-line) = 95.10
(Values related to conditional expression (5))
|Δ$\upsilon$3BA| (difference of Abbe numbers of positive lens $L_{532A}$ and negative lens $L_{532B}$ with respect to d-line)| = 30.90
(Values related to conditional expression (6))
|Δ$\upsilon$4BA| (difference of Abbe numbers of positive lens $L_{542A}$ and negative lens $L_{542B}$ with respect to d-line)| = 51.56
(Values related to conditional expression (7))
f5 (focal length of fifth lens group $G_{55}$) = $-71.005$
|f3/f5| = 0.44
(Values related to conditional expression (8))
f4 (focal length of fourth lens group $G_{54}$) = 29.800
|f4/f5| = 0.42
(Values related to conditional expression (9))
N4ob (refractive index of positive lens $L_{541A}$ with respect to d-line) = 1.88300
(Values related to conditional expression (10))
θ1(W) (maximum angle of incidence of marginal ray at maximum angle of view for wide angle edge, to lens surface farthest on object side of fourth lens group $G_{54}$) = 8.111
θ1(W)/$\omega$W = 0.38
(Values related to conditional expression (11))
θ1(T) (maximum angle of incidence of marginal ray at -continued Focal length of entire zoom lens = 8.20 (wide angle edge) to
48.55 (fT: telephoto edge)
F number = 1.63 (wide angle edge) to 1.95 (telephoto edge)
Half-angle (ω) = 21.22 (ωW: wide angle edge) to 3.49 (ωT: telephoto edge)

maximum angle of view for telephoto edge, to lens surface
farthest on object side of fourth lens group $G_{54}$) = 9.929
θ1(T)/ωT = 2.85
(Values related to conditional expression (12))
υ3a (Abbe number of positive lens $L_{531}$ with respect to
d-line) = 67.02

FIG. 11 is a diagram of various types of aberration occurring in the zoom lens according to the fifth embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 12:
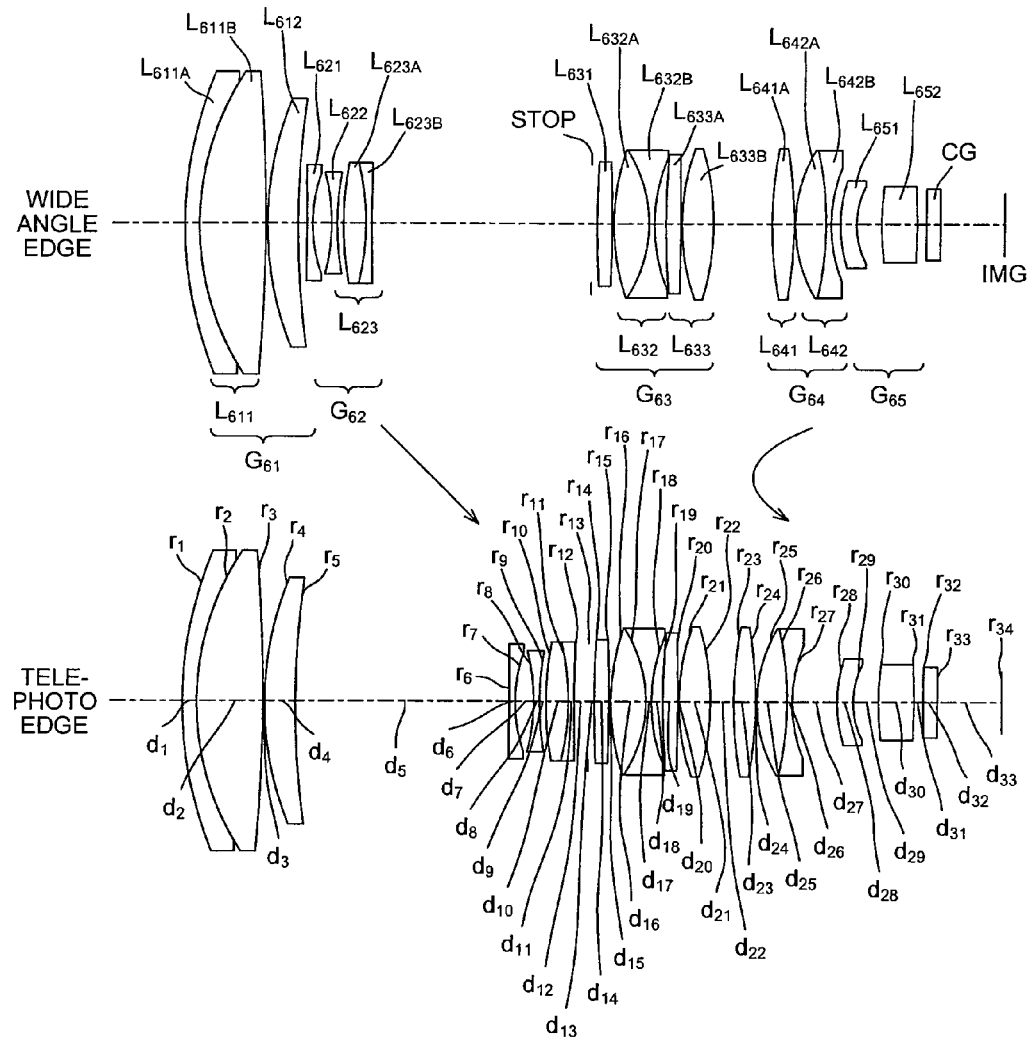
FIG. 12 is a cross sectional view (along the optical axis) of the zoom lens according to a sixth embodiment.

FIG. 12 is a cross sectional view (along the optical axis) of the zoom lens according to a sixth embodiment. The zoom lens includes sequentially from the object side, a first lens group $G_{61}$ having a positive refractive power, a second lens group $G_{62}$ having a negative refractive power, the aperture stop STOP, a third lens group $G_{63}$ having a positive refractive power, a fourth lens group $G_{64}$ having a positive refractive power, and a fifth lens group $G_{65}$ having a positive refractive power.

The cover glass CG is disposed between the fifth lens group $G_{65}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{61}$ includes sequentially from the object side, a cemented lens $L_{611}$ formed by a negative lens $L_{611A}$ and a positive lens $L_{611B}$, and a positive lens $L_{612}$.

The second lens group $G_{62}$ includes sequentially from the object side, a negative lens $L_{621}$, a negative lens $L_{622}$, and a cemented lens $L_{623}$ formed by a positive lens $L_{623A}$ and a negative lens $L_{623B}$.

The third lens group $G_{63}$ includes sequentially from the object side, a positive lens $L_{631}$, a cemented lens $L_{632}$ formed by a positive lens $L_{632A}$ and a negative lens $L_{63213}$, and a positive lens group $L_{633}$ configured by a positive lens $L_{633A}$ and a positive lens $L_{633B}$. Both surfaces of the positive lens $L_{631}$ are aspheric.

The fourth lens group $G_{64}$ includes sequentially from the object side, a positive lens group $L_{641}$ configured by a positive lens $L_{641A}$, and a cemented lens $L_{642}$ formed by a positive lens $L_{642A}$ and negative lens $L_{642B}$.

The fifth lens group $G_{65}$ includes sequentially from the object side, a negative lens $L_{651}$ and a positive lens $L_{652}$.

The zoom lens zooms from the wide angle edge to the telephoto edge by moving the second lens group $G_{62}$ along the optical axis, from the object side to the imaging plane IMG side. Further, the zoom lens corrects image plane variations accompanying zooming and performs focusing by moving the fourth lens group $G_{64}$ along the optical axis.

Here, various values related to the zoom lens according to the sixth embodiment are given.

Focal length of entire zoom lens = 8.21 (wide angle edge) to
48.61 (fT: telephoto edge)
F number = 1.62 (wide angle edge) to 1.77 (telephoto edge)
Half-angle (ω) = 24.18 (ωW: wide angle edge) to 3.90
(ωT: telephoto edge)

(Lens data)

| | | | |
|---|---|---|---|
| $r_1$ = 42.2486 | $d_1$ = 1.50 | $nd_1$ = 1.80809 | $υd_1$ = 22.76 |
| $r_2$ = 30.0207 | $d_2$ = 7.27 | $nd_2$ = 1.49700 | $υd_2$ = 81.61 |
| $r_3$ = −193.8119 | $d_3$ = 0.18 | | |
| $r_4$ = 36.6647 | $d_4$ = 3.34 | $nd_3$ = 1.61800 | $υd_3$ = 63.39 |
| $r_5$ = 86.8993 | $d_5$ = D(5) (variable) | | |
| $r_6$ = 668.6868 | $d_6$ = 0.61 | $nd_4$ = 1.83400 | $υd_4$ = 37.34 |
| $r_7$ = 17.0948 | $d_7$ = 2.16 | | |
| $r_8$ = −20.1399 | $d_8$ = 0.60 | $nd_5$ = 1.91082 | $υd_5$ = 35.25 |
| $r_9$ = 37.3828 | $d_9$ = 0.70 | | |
| $r_{10}$ = 34.3546 | $d_{10}$ = 2.46 | $nd_6$ = 1.95906 | $υd_6$ = 17.47 |
| $r_{11}$ = −27.5232 | $d_{11}$ = 0.59 | $nd_7$ = 1.91082 | $υd_7$ = 35.25 |
| $r_{12}$ = 155.9044 | $d_{12}$ = D(12) (variable) | | |
| $r_{13}$ = ∞ (aperture stop) | $d_{13}$ = 0.70 | | |
| $r_{14}$ = 112.4884 (aspheric surface) | $d_{14}$ = 1.62 | $nd_8$ = 1.59201 | $υd_8$ = 67.02 |
| $r_{15}$ = −115.4826 (aspheric surface) | $d_{15}$ = 0.15 | | |
| $r_{16}$ = 25.7271 | $d_{16}$ = 3.80 | $nd_9$ = 1.43700 | $υd_9$ = 95.10 |
| $r_{17}$ = −14.9982 | $d_{17}$ = 0.59 | $nd_{10}$ = 1.51680 | $υd_{10}$ = 64.20 |
| $r_{18}$ = 18.8302 | $d_{18}$ = 1.28 | | |
| $r_{19}$ = 100.0134 | $d_{19}$ = 1.59 | $nd_{11}$ = 1.43700 | $υd_{11}$ = 95.10 |
| $r_{20}$ = −488.7620 | $d_{20}$ = 0.10 | | |
| $r_{21}$ = 25.0010 | $d_{21}$ = 3.45 | $nd_{12}$ = 1.43700 | $υd_{12}$ = 95.10 |
| $r_{22}$ = −26.8748 | $d_{22}$ = D(22) (variable) | | |
| $r_{23}$ = 41.6247 | $d_{23}$ = 2.49 | $nd_{13}$ = 1.88300 | $υd_{13}$ = 40.80 |
| $r_{24}$ = −48.0201 | $d_{24}$ = 0.10 | | |
| $r_{25}$ = 16.0088 | $d_{25}$ = 3.31 | $nd_{14}$ = 1.49700 | $υd_{14}$ = 81.61 |
| $r_{26}$ = −31.3121 | $d_{26}$ = 0.60 | $nd_{15}$ = 1.69895 | $υd_{15}$ = 30.05 |
| $r_{27}$ = 17.5888 | $d_{27}$ = D(27) (variable) | | |
| $r_{28}$ = 16.6456 | $d_{28}$ = 1.77 | $nd_{16}$ = 1.75211 | $υd_{16}$ = 25.05 |
| $r_{29}$ = 9.4367 | $d_{29}$ = 2.80 | | |
| $r_{30}$ = 34.8157 | $d_{30}$ = 3.95 | $nd_{17}$ = 1.80420 | $υd_{17}$ = 46.50 |
| $r_{31}$ = −66.2378 | $d_{31}$ = 1.10 | | |
| $r_{32}$ = ∞ | $d_{32}$ = 1.50 | $nd_{18}$ = 1.51633 | $υd_{18}$ = 64.14 |
| $r_{33}$ = ∞ | $d_{33}$ = D(33) (variable) | | |
| $r_{34}$ = ∞ (imaging plane) | | | |

Constants of the cone (k) and aspheric coefficients (A, B, C, D, E)

(Fourteenth plane)

k = 1.0000,
A = 0,
B = 1.72586 × 10$^{-6}$, C = −6.66653 × 10$^{-7}$,
D = 9.36800 × 10$^{-9}$, E = −1.37530 × 10$^{-10}$
(Fifteenth plane)

k = 1.0000,
A = 0,
B = 3.34464 × 10$^{-5}$, C = −5.94406 × 10$^{-7}$,
D = 8.11846 × 10$^{-9}$, E = −1.21767 × 10$^{-10}$ (Zoom data)

| | wide angle edge | telephoto edge |
|---|---|---|
| D(5) | 1.0103 | 23.5418 |
| D(12) | 24.1323 | 1.6906 |
| D(22) | 6.4253 | 2.4590 |
| D(27) | 1.0048 | 4.9397 |
| D(33) | 7.0137 | 6.9892 |

(Values related to conditional expression (1))
f3 (focal length of third lens group $G_{63}$) = 31.011
f3/fT = 0.64

-continued

Focal length of entire zoom lens = 8.21 (wide angle edge) to
48.61 (fT: telephoto edge)
F number = 1.62 (wide angle edge) to 1.77 (telephoto edge)
Half-angle (ω) = 24.18 (ωW: wide angle edge) to 3.90
(ωT: telephoto edge)

(Values related to conditional expression (2))
ΔD4 (difference of interval between third lens group $G_{63}$
and fourth lens group $G_{64}$ at wide angle edge and interval
between third lens group $G_{63}$ and fourth lens group $G_{64}$ at
telephoto edge) = 3.935
ΔD4/fT = 0.08
(Values related to conditional expression (3))
β3T (zoom ratio of third lens group $G_{63}$ at telephoto
edge) = −4.788
β4T (zoom ratio of fourth lens group $G_{64}$ at telephoto
edge) = 0.146
β3T/β4T = −32.90
(Values related to conditional expression (4))
ʋ3p (Abbe number of positive lens $L_{632A}$ with respect to d-
line) = 95.10
(Values related to conditional expression (5))
|Δʋ3BA (difference of Abbe numbers of positive lens $L_{632A}$
and negative lens $L_{632B}$ with respect to d-line)| = 30.90
(Values related to conditional expression (6))
|Δʋ4BA (difference of Abbe numbers of positive lens $L_{642A}$
and negative lens $L_{642B}$ with respect to d-line)| = 51.56
(Values related to conditional expression (7))
f5 (focal length of fifth lens group $G_{65}$) = 167.056
|f3/f5| = 0.19
(Values related to conditional expression (8))
f4 (focal length of fourth lens group $G_{64}$) = 29.987
|f4/f5| = 0.18
(Values related to conditional expression (9))
N4ob (refractive index of positive lens $L_{641A}$ with respect
to d-line) = 1.88300
(Values related to conditional expression (10))
θ1(W) (maximum angle of incidence of marginal ray at
maximum angle of view for wide angle edge, to lens surface
farthest on object side of fourth lens group $G_{64}$) = 12.373
θ1(W)/ωW = 0.51
(Values related to conditional expression (11))
θ1(T) (maximum angle of incidence of marginal ray at
maximum angle of view for telephoto edge, to lens surface
farthest on object side of fourth lens group $G_{64}$) = 13.408
θ1(T)/ωT = 3.43
(Values related to conditional expression (12))
ʋ3a (Abbe number of positive lens $L_{631}$ with respect to
d-line) = 67.02

FIG. 13 is a diagram of various types of aberration occurring in the zoom lens according to the sixth embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 14:
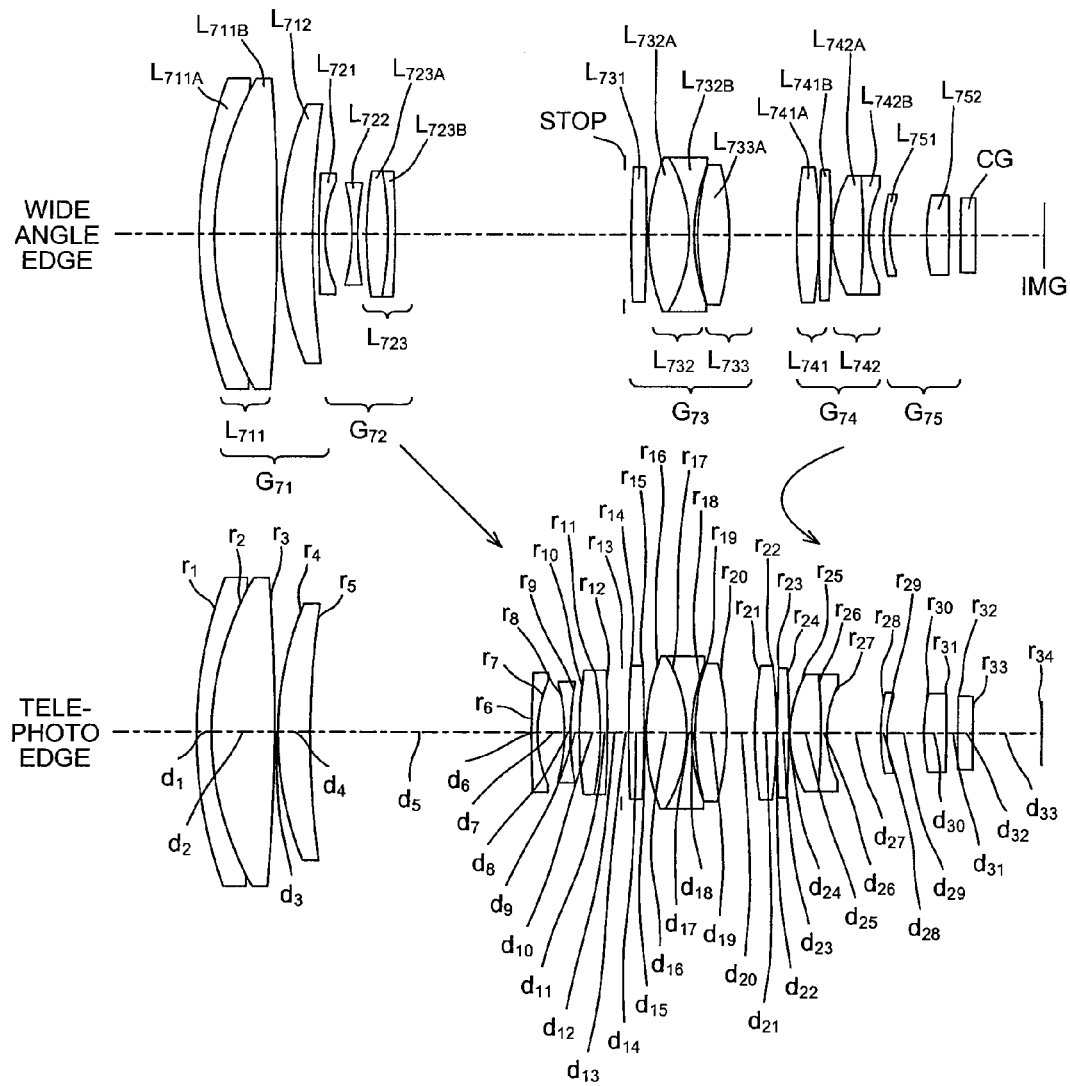
FIG. 14 is a cross sectional view (along the optical axis) of the zoom lens according to a seventh embodiment.

FIG. 14 is a cross sectional view (along the optical axis) of the zoom lens according to a seventh embodiment. The zoom lens includes sequentially from the object side, a first lens group $G_{71}$ having a positive refractive power, a second lens group $G_{72}$ having a negative refractive power, the aperture stop STOP, a third lens group $G_{73}$ having a positive refractive power, a fourth lens group $G_{74}$ having a positive refractive power, and a fifth lens group $G_{75}$ having a positive refractive power.

The cover glass CG is disposed between the fifth lens group $G_{75}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{71}$ includes sequentially from the object side, a cemented lens $L_{711}$ formed by a negative lens $L_{711A}$ and a positive lens $L_{711B}$, and a positive lens $L_{712}$.

The second lens group $G_{72}$ includes sequentially from the object side, a negative lens $L_{721}$, a negative lens $L_{722}$, and a cemented lens $L_{723}$ formed by a positive lens $L_{723A}$ and a negative lens $L_{723B}$.

The third lens group $G_{73}$ includes sequentially from the object side, a positive lens $L_{731}$, a cemented lens $L_{732}$ formed by a positive lens $L_{732A}$ and a negative lens $L_{732B}$, and a positive lens group $L_{733}$ configured by a positive lens $L_{733A}$. Both surfaces of the positive lens $L_{731}$ are aspheric.

The fourth lens group $G_{74}$ includes sequentially from the object side, a positive lens group $L_{741}$ configured by a positive lens $L_{741A}$ and a positive lens $L_{741B}$, and a cemented lens $L_{742}$ formed by a positive lens $L_{742A}$ and negative lens $L_{742B}$.

The fifth lens group $G_{75}$ includes sequentially from the object side, a negative lens $L_{751}$ and a positive lens $L_{752}$.

The zoom lens zooms from the wide angle edge to the telephoto edge by moving the second lens group $G_{72}$ along the optical axis, from the object side to the imaging plane IMG side. Further, the zoom lens corrects image plane variations accompanying zooming and performs focusing by moving the fourth lens group $G_{74}$ along the optical axis.

Here, various values related to the zoom lens according to the seventh embodiment are given.

Focal length of entire zoom lens = 8.20 (wide angle edge) to
48.55 (fT: telephoto edge)
F number = 1.63 (wide angle edge) to 1.98 (telephoto edge)
Half-angle (ω) = 23.83 (ωW: wide angle edge) to 3.91 (ωT:
telephoto edge)

(Lens data)

| | | | |
|---|---|---|---|
| $r_1$ = 44.6737 | $d_1$ = 1.50 | $nd_1$ = 1.80809 | $ʋd_1$ = 22.76 |
| $r_2$ = 30.7811 | $d_2$ = 6.40 | $nd_2$ = 1.49700 | $ʋd_2$ = 81.61 |
| $r_3$ = −154.8520 | $d_3$ = 0.15 | | |
| $r_4$ = 32.9952 | $d_4$ = 3.27 | $nd_3$ = 1.61800 | $ʋd_3$ = 63.39 |
| $r_5$ = 79.0541 | $d_5$ = D(5) (variable) | | |
| $r_6$ = 113.0517 | $d_6$ = 0.60 | $nd_4$ = 1.83400 | $ʋd_4$ = 37.34 |
| $r_7$ = 13.5063 | $d_7$ = 2.80 | | |
| $r_8$ = −16.7218 | $d_8$ = 0.60 | $nd_5$ = 1.91082 | $ʋd_5$ = 35.25 |
| $r_9$ = 36.7313 | $d_9$ = 0.78 | | |
| $r_{10}$ = 36.9640 | $d_{10}$ = 2.30 | $nd_6$ = 1.95906 | $ʋd_6$ = 17.47 |
| $r_{11}$ = −28.9425 | $d_{11}$ = 0.60 | $nd_7$ = 1.91082 | $ʋd_7$ = 35.25 |
| $r_{12}$ = −108.2819 | $d_{12}$ = D(12) (variable) | | |
| $r_{13}$ = ∞ (aperture stop) | $d_{13}$ = 0.70 | | |
| $r_{14}$ = 122.0734 (aspheric surface) | $d_{14}$ = 1.53 | $nd_8$ = 1.59201 | $ʋd_8$ = 67.02 |
| $r_{15}$ = −178.2336 (aspheric surface) | $d_{15}$ = 0.15 | | |
| $r_{16}$ = 21.2654 | $d_{16}$ = 4.10 | $nd_9$ = 1.43700 | $ʋd_9$ = 95.10 |
| $r_{17}$ = −15.0000 | $d_{17}$ = 0.60 | $nd_{10}$ = 1.51680 | $ʋd_{10}$ = 64.20 |
| $r_{18}$ = 21.0000 | $d_{18}$ = 0.22 | | |
| $r_{19}$ = 25.0000 | $d_{19}$ = 3.22 | $nd_{11}$ = 1.43700 | $ʋd_{11}$ = 95.10 |
| $r_{20}$ = −26.1079 | $d_{20}$ = D(20) (variable) | | |
| $r_{21}$ = 40.2911 | $d_{21}$ = 2.21 | $nd_{12}$ = 1.88300 | $ʋd_{12}$ = 40.80 |
| $r_{22}$ = −62.2904 | $d_{22}$ = 0.10 | | |
| $r_{23}$ = 500.0000 | $d_{23}$ = 1.17 | $nd_{13}$ = 1.88300 | $ʋd_{13}$ = 40.80 |
| $r_{24}$ = −160.3827 | $d_{24}$ = 0.10 | | |
| $r_{25}$ = 12.2830 | $d_{25}$ = 3.08 | $nd_{14}$ = 1.49700 | $ʋd_{14}$ = 81.61 |
| $r_{26}$ = −73.4161 | $d_{26}$ = 0.60 | $nd_{15}$ = 1.69895 | $ʋd_{15}$ = 30.05 |
| $r_{27}$ = 12.0235 | $d_{27}$ = D(27) (variable) | | |
| $r_{28}$ = 19.3772 | $d_{28}$ = 0.60 | $nd_{16}$ = 1.75211 | $ʋd_{16}$ = 25.05 |
| $r_{29}$ = 10.2034 | $d_{29}$ = 3.72 | | |
| $r_{30}$ = 19.8644 | $d_{30}$ = 2.30 | $nd_{17}$ = 1.80420 | $ʋd_{17}$ = 46.50 |
| $r_{31}$ = −255.6251 | $d_{31}$ = 1.10 | | |
| $r_{32}$ = ∞ | $d_{32}$ = 1.50 | $nd_{18}$ = 1.51633 | $ʋd_{18}$ = 64.14 |

-continued

Focal length of entire zoom lens = 8.20 (wide angle edge) to
48.55 (fT: telephoto edge)
F number = 1.63 (wide angle edge) to 1.98 (telephoto edge)
Half-angle (ω) = 23.83 (ωW: wide angle edge) to 3.91 (ωT:
telephoto edge)

$r_{33} = \infty$   $d_{33} = D(33)$
                   (variable)
$r_{34} = \infty$
(imaging plane)

Constants of the cone (k) and aspheric coefficients (A, B, C, D, E)

(Fourteenth plane)

k = 1.0000,
A = 0,
B = −2.39367 × 10$^{-6}$, C = −7.52715 × 10$^{-7}$,
D = 8.53601 × 10$^{-9}$, E = −9.34460 × 10$^{-11}$
(Fifteenth plane)

k = 1.0000,
A = 0,
B = 3.32622 × 10$^{-5}$, C = −6.81784 × 10$^{-7}$,
D = 8.78755 × 10$^{-9}$, E = −9.67011 × 10$^{-11}$ (Zoom data)

| | wide angle edge | telephoto edge |
|---|---|---|
| D(5) | 0.7701 | 22.3651 |
| D(12) | 23.0585 | 1.4635 |
| D(20) | 6.6765 | 2.7439 |
| D(27) | 1.4833 | 5.4159 |
| D(33) | 6.9999 | 6.9896 |

(Values related to conditional expression (1))
f3 (focal length of third lens group $G_{73}$) = 31.498
f3/fT = 0.65
(Values related to conditional expression (2))
ΔD4 (difference of interval between third lens group $G_{73}$
and fourth lens group $G_{74}$ at wide angle edge and interval
between third lens group $G_{73}$ and fourth lens group $G_{74}$ at
telephoto edge) = 3.933
ΔD4/fT = 0.08
(Values related to conditional expression (3))
β3T (zoom ratio of third lens group $G_{73}$ at telephoto
edge) = −8.156
β4T (zoom ratio of fourth lens group $G_{74}$ at telephoto
edge) = 0.091
β3T/β4T = −89.92
(Values related to conditional expression (4))
υ3p (Abbe number of positive lens $L_{732A}$ with respect to d-
line) = 95.10
(Values related to conditional expression (5))
|Δυ3BA (difference of Abbe numbers of positive lens $L_{732A}$
and negative lens $L_{732B}$ with respect to d-line)| = 30.90
(Values related to conditional expression (6))
|Δυ4BA (difference of Abbe numbers of positive lens $L_{742A}$
and negative lens $L_{742B}$ with respect to d-line)| = 51.56
(Values related to conditional expression (7))
f5 (focal length of fifth lens group $G_{75}$) = 68.501
|f3/f5| = 0.46
(Values related to conditional expression (8))
f4 (focal length of fourth lens group $G_{74}$) = 28.467
|f4/f5| = 0.42
(Values related to conditional expression (9))
N4ob (refraction index of positive lens $L_{741A}$ with respect
to d-line) = 1.88300
(Values related to conditional expression (10))
θ1(W) (maximum angle of incidence of marginal ray at maximum
angle of view for wide angle edge, to lens surface farthest
on object side of fourth lens group $G_{74}$) = 12.677
θ1(W)/ωW = 0.53
(Values related to conditional expression (11))
θ1(T) (maximum angle of incidence of marginal ray at
maximum angle of view for telephoto edge, to lens surface
farthest on object side of fourth lens group $G_{74}$) = 12.793
θ1(T)/ωT = 3.27

-continued

Focal length of entire zoom lens = 8.20 (wide angle edge) to
48.55 (fT: telephoto edge)
F number = 1.63 (wide angle edge) to 1.98 (telephoto edge)
Half-angle (ω) = 23.83 (ωW: wide angle edge) to 3.91 (ωT:
telephoto edge)

(Values related to conditional expression (12))
υ3a (Abbe number of positive lens $L_{731}$ with respect to
d-line) = 67.02

FIG. 15 is a diagram of various types of aberration occurring in the zoom lens according to the seventh embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Among the values for each of the embodiments, r1, r2, . . . indicate radii of curvature for each lens, aperture stop surface, etc.; d1, d2, . . . indicate the thickness of the lenses, aperture stop, etc. or the distance between surfaces thereof; nd1, nd2, . . . indicate the refraction index of each lens with respect to the d-line (λ=587.56 nm); and υd1, υd2, . . . indicate the Abbe number with respect to the d-line (λ=587.56 nm) of each lens. Lengths are indicated in units of [mm] and angles are indicated in [degrees].

Each aspheric shape above is expressed by equation [1], where H is a height orthogonal to the optical axis; X(H) is displacement (in a direction along the optical axis) at a height H when the apex of the lens surface is regarded as the origin; R is paraxial radius of curvature; k is the constant of the cone; and A, B, C, D, and E are the fourth, sixth, eighth, and tenth order aspheric coefficients, respectively.

$$X(H) = \frac{H^2/R}{1 + \sqrt{1 - (kH^2/R^2)}} + AH^2 + BH^4 + CH^6 + DH^8 + EH^{10} \quad [1]$$

As described, the zoom lens of each of the embodiments achieves a long focal length by a simple and compact structure, favorably corrects various types of aberration occurring over the entire zoom range with respect to light from the visible light range to the near-infrared light range, and can realize a high-resolution optical system capable of handling megapixel counts. In particular, by satisfying the conditional expressions above, the zoom lens achieves more favorable optical performance with sacrificing size reductions of the optical system.

As described, the zoom lens according to the present invention is useful in a small imaging apparatus equipped with a solid state image sensor such as digital still camera and a digital video camera. In particular, the zoom lens is optimal for a surveillance camera equipped with a solid state image sensor of a high pixel count.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2012-035639 filed in Japan on Feb. 21, 2012.

What is claimed is:

1. A zoom lens comprises sequentially from an object side, a first lens group having a positive refractive power, a second lens group having a negative refractive power, an aperture stop, a third lens group having a positive refractive power, a fourth lens group having a positive refractive power, and fifth lens group, wherein
the second lens group is moved along an optical axis, from the object side toward an image side, to zoom from a wide angle edge to a telephoto edge,
the fourth lens group is moved along the optical axis to correct image plane variation accompanying zooming,
the third lens group includes sequentially from the object side, a positive lens having at least one aspheric surface, a cemented lens formed by a positive lens and a negative lens, and a positive lens group,
the fourth lens group includes sequentially from the object side, a positive lens group, and a cemented lens formed by a positive lens and a negative lens, and
the fifth lens group includes sequentially from the object side, at least one negative lens and at least one positive lens.

2. The zoom lens according to claim 1, wherein the zoom lens satisfies:
a conditional expression (1) $0.50 \leq f3/fT \leq 0.80$,
a conditional expression (2) $0.08 \leq \Delta D4/fT \leq 0.20$,
a conditional expression (3) $-300 \leq \beta 3T/\beta 4T \leq -20$, and
a conditional expression (4) $90 \leq \upsilon 3p \leq 100$,
where, f3 represents a focal length of the third lens group; fT represents an optical system focal length at the telephoto edge; $\Delta D4$ represents a difference of an interval between the third lens group and the fourth lens group at the wide angle edge and an interval between the third lens group and the fourth lens group at the telephoto edge; $\beta 3T$ represents a zoom ratio of the third lens group at the telephoto edge; $\beta 4T$ represents a zoom ratio of the fourth lens group at the telephoto edge; and $\upsilon 3p$ represents, with respect to d-line, an Abbe number of the positive lens forming the cemented lens in the third lens group.

3. The zoom lens according to claim 1, wherein the zoom lens satisfies:
a conditional expression (5) $30 \leq |\Delta \upsilon 3BA| \leq 78$, and
a conditional expression (6) $50 \leq |\Delta \upsilon 4BA| \leq 78$,
where, $\Delta \upsilon 3BA$ represents, with respect to d-line, a difference of Abbe numbers of the positive lens and the negative forming the cemented lens in the third lens group; and $\Delta \upsilon 4BA$ represents, with respect to the d-line, a difference of Abbe numbers of the positive lens and the negative lens forming the cemented lens in the fourth lens group.

4. The zoom lens according to claim 1, wherein the zoom lens satisfies:
a conditional expression (7) $0.10 \leq |f3/f5| \leq 0.70$, and
a conditional expression (8) $0.10 \leq |f4/f5| \leq 0.70$,
where, f3 represents a focal length of the third lens group; f4 represents a focal length of the fourth lens group; and f5 represents a focal length of the fifth lens group.

5. The zoom lens according to claim 1, wherein the zoom lens satisfies:
a conditional expression (9) $1.85 \leq N4ob \leq 1.95$,
a conditional expression (10) $0.30 \leq \theta 1(W)/\omega W \leq 60$, and
a conditional expression (11) $2.5 \leq \theta 1(T)/\omega T \leq 5.0$,
where, N4ob represents, with respect to d-line, a refractive index of a positive lens disposed farthest on the object side of the fourth lens group; $\theta 1(W)$ represents a maximum angle of incidence of a marginal ray at a maximum angle of view for the wide angle edge, to a lens surface farthest on the object side of the fourth lens group; $\omega w$ represents a half-angle of the optical system at the wide angle edge; $\theta 1(T)$ represents a maximum angle of incidence of a marginal ray at a maximum angle of view for the telephoto edge, to the lens surface farthest on the object side of the fourth lens group; and $\omega T$ represents a half-angle of the optical system at the telephoto edge.

6. The zoom lens according to claim 1, wherein the zoom lens satisfies a conditional expression (12) $65.0 \leq \upsilon 3a \leq 85.0$, where, $\upsilon 3a$ represents, with respect to d-line, an Abbe number of the positive lens farthest on the object side of the third lens group.

* * * * *